United States Patent
Chyziak et al.

(10) Patent No.: US 11,748,289 B2
(45) Date of Patent: Sep. 5, 2023

(54) PROTOCOL AWARE BRIDGE CIRCUIT FOR LOW LATENCY COMMUNICATION AMONG INTEGRATED CIRCUITS

(71) Applicant: Xilinx, Inc., San Jose, CA (US)

(72) Inventors: Michael Chyziak, Campbell, CA (US); Raghukul B. Dikshit, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/455,125

(22) Filed: Nov. 16, 2021

(65) Prior Publication Data
US 2023/0153260 A1    May 18, 2023

(51) Int. Cl.
*G06F 13/40*    (2006.01)
*G06F 13/42*    (2006.01)

(52) U.S. Cl.
CPC ...... *G06F 13/4027* (2013.01); *G06F 13/4282* (2013.01)

(58) Field of Classification Search
CPC .......... G06F 13/4027; G06F 13/4282
See application file for complete search history.

(56) References Cited

U.S. PATENT DOCUMENTS

| | | | | |
|---|---|---|---|---|
| 2004/0037313 A1* | 2/2004 | Gulati | ............... | H04L 12/56 370/465 |
| 2012/0239846 A1* | 9/2012 | Baumer | ............... | H04L 43/50 710/305 |
| 2013/0250792 A1* | 9/2013 | Yoshida | ............... | H04L 49/9047 370/252 |
| 2016/0182391 A1* | 6/2016 | Theobald | ............... | H04L 47/39 370/230 |
| 2017/0220508 A1* | 8/2017 | Kaviani | ............... | G06F 13/4022 |
| 2018/0102863 A1* | 4/2018 | Royle | ............... | H03L 7/00 |
| 2018/0285125 A1* | 10/2018 | Chhabbi | ............... | G06F 13/38 |
| 2019/0050361 A1* | 2/2019 | Raghava | ............... | G06F 13/4027 |
| 2019/0227963 A1* | 7/2019 | Ooi | ............... | G06F 30/34 |
| 2019/0349095 A1* | 11/2019 | Briseno-Vidrios | ... | H01L 25/162 |

OTHER PUBLICATIONS https://www.synopsys.com/verification/emulation.html, Emulation, 6 pages.
https://www.electronicdesign.com/technologies/test-measurement/article/21800385/hardware-emulation-a-weapon-of-mass-verification, Hardware Emulation: A Weapon of Mass Verification, Lauro Rizzatti, 12 pages.

* cited by examiner

*Primary Examiner* — Henry Tsai
*Assistant Examiner* — Harry Z Wang
(74) *Attorney, Agent, or Firm* — Kevin T. Cuenot

(57) ABSTRACT

A system includes a bridge circuit configured for low latency communication among integrated circuits (ICs). The bridge circuit includes a plurality of transceiver circuits. Each transceiver circuit is coupled to a corresponding parallel channel in the IC. Each transceiver circuit is configured to send and receive data over the corresponding parallel channel. Each transceiver circuit includes a transmit channel configured to packetized data received from the corresponding parallel channel for transmission over a serial link to a second IC. Each transceiver circuit includes a receive channel configured to depacketize data received from the serial link from the second IC. The serial link is asynchronous to each of parallel channel coupled to the first bridge circuit.

20 Claims, 10 Drawing Sheets

600

| Packet ID 602 | Channel No. 604 | Sequence No. 606 | Packet Size 608 | Data 610 | Error Code 612 |
|---|---|---|---|---|---|

|   | Write Counter | Read Counter | Free Space | Credits Issued |
|---|---|---|---|---|
| 1 | 0 | 0 | 128 | 128 |
| 2 | 20 | 8 | 116 | 0 |
| 3 | 80 | 50 | 98 | 0 |
| 4 | 90 | 70 | 108 | 70 |

Partition the circuit design along a partition boundary defined by an on-chip bus interconnect resulting in a plurality of partitions of the circuit design including a first partition and a second partition

1102

↓

Insert bridge circuits for the partitions of the circuit design

1104

↓

Implement the first partition in a first integrated circuit with a first bridge circuit and implementing the second partition in a second integrated circuit with a second bridge circuit, wherein the first bridge circuit is coupled to a plurality of first channels of the first partition and each channel of the plurality of first channels includes one or more sub-channels, and the second bridge circuit is coupled to a plurality of second channels of the second partition

1106

↓

During runtime of an emulation of the circuit design, converting, using the first bridge circuit, data from selected ones of the sub-channels of the plurality of first channels into packetized data and transmitting the packetized data over a serial link

1108

↓

In response to receiving the packetized data via the second bridge circuit, depacketizing the packetized data, mapping the data to selected sub-channels of the plurality of second channels, wherein the selected sub-channels of the plurality of second channels correspond to respective ones of the selected sub-channels of the plurality of first channels

1110

↓

Output the data on the selected sub-channels of the plurality of second channels to the second partition.

PROTOCOL AWARE BRIDGE CIRCUIT FOR LOW LATENCY COMMUNICATION AMONG INTEGRATED CIRCUITS

TECHNICAL FIELD

This disclosure relates to integrated circuits (ICs) and, more particularly, to a protocol aware bridge circuit capable of implementing low latency communication among integrated circuits.

BACKGROUND

Some emulation systems use multiple integrated circuits (ICs) to provide in-circuit emulation of circuit designs. Often, the ICs are programmable ICs such as Field Programmable Gate Arrays or "FPGAs." Silicon components of the circuit design to be emulated may be synthesized and mapped to equivalent hardware resources on the ICs of the emulation system. In most cases, since the circuit design does not fit within a single IC for purposes of emulation, the circuit design is partitioned for implementation across the multiple ICs of the emulation system. In a typical circuit design for a System-on-Chip, for example, the number of nets that cross between ICs of the emulator system post-partitioning may be in the range of 5-25 thousand.

Typically, each IC of the emulation system shares inputs/outputs (I/Os) with multiple other ICs. The ICs of the emulation system typically connect via Select I/Os in a mesh architecture. There are fewer available Select I/Os than partitioned or cut nets that must cross IC boundaries in the emulation system. To accommodate the number of nets that must cross between ICs to emulate the circuit design, the data from the nets is time division multiplexed before being transmitted from one IC to another. This process is referred to as "pin-multiplexing" or "pin-muxing." The speed of the emulation clock, in reference to the clock used to clock the circuitry being emulated in the IC, is reduced to match the multiplexing ratio. In general, the higher the multiplexing ratio, the lower the frequency of the emulation clock.

Available emulation systems utilize Select I/O to transmit cycle accurate data between ICs. Select I/O is limited in its ability to scale with size and transistor counts of circuit designs. One consequence is that Select I/O imposes a bottleneck on emulation performance where increased multiplexing ratios lead to lower emulation clock frequencies. The I/O limitations of ICs also adversely impact performance of the implementation tools as the amount of time needed to achieve a viable partitioning and implementation of the circuit design across the ICs of the emulation system may be significant. Ever increasing circuit design size will likely exacerbate these inefficiencies.

SUMMARY

In one or more example implementations, a system can include an integrated circuit (IC) having a bridge circuit disposed therein. The bridge circuit includes a plurality of transceiver circuits. Each transceiver circuit is coupled to a corresponding parallel channel in the IC. Each transceiver circuit is configured to send and receive data over the corresponding parallel channel. Each transceiver circuit includes a transmit channel configured to packetized data received from the corresponding parallel channel for transmission over a serial link to a second IC. Each transceiver circuit includes a receive channel configured to depacketize data received from the serial link from the second IC. The serial link is asynchronous to each parallel channel coupled to the first bridge circuit.

In one or more example implementations, a system includes a first IC including a first partition of a circuit design coupled to a first bridge circuit. The first bridge circuit is coupled to the first partition through a plurality of first parallel channels. Each first parallel channel includes one or more sub-channels. The first bridge circuit is configured to packetize data from selected sub-channels of the plurality of first parallel channels for conveyance over a serial link. The system includes a second IC including a second partition of the circuit design coupled to a second bridge circuit through a plurality of second parallel channels. The second bridge circuit is configured to depacketize data received over the serial link, map the depacketized data to selected sub-channels of the plurality of second parallel channels, and output the depacketized data over the selected sub-channels of the plurality of second parallel channels. The selected sub-channels of the plurality of second parallel channels correspond to respective ones of the selected sub-channels of the plurality of first parallel channels.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 6 illustrates an example of a packet generated by a packetizer of a bridge circuit.

FIG. 7 is a table illustrating certain operative features of credit-based data transfers performed between bridge circuits.

FIG. 11 is an example method of implementing a circuit design using a multi-IC system and the bridge circuit architectures described herein.

DETAILED DESCRIPTION

Figure 1:
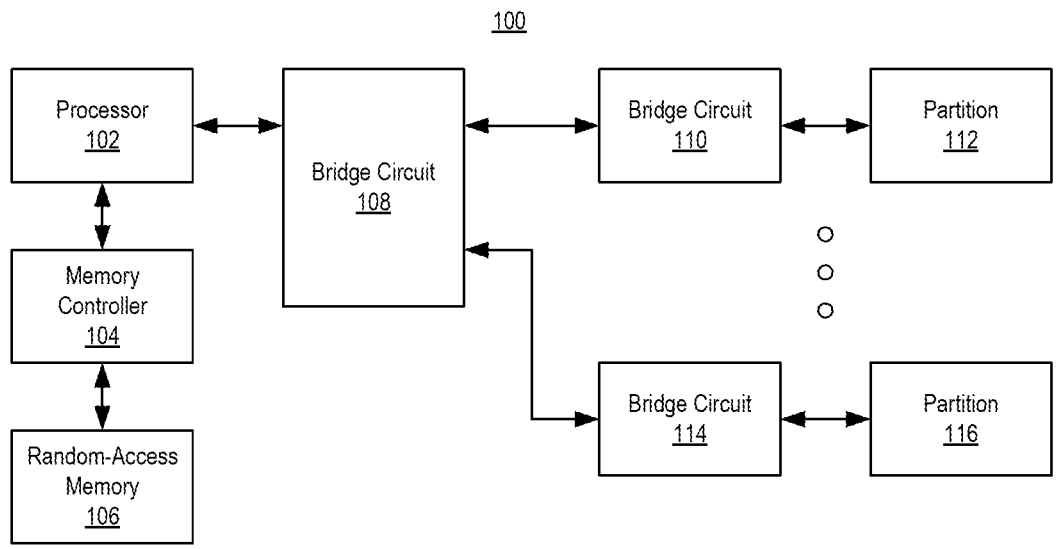
FIG. 1 illustrates an example of a system including multiple integrated circuits (ICs) for use with the inventive arrangements described within this disclosure.

This disclosure relates to integrated circuits (ICs) and, more particularly, to multi-IC systems that utilize serial communication links to facilitate communication between the ICs of the system. In accordance with the inventive arrangements described within this disclosure, methods, systems, and computer program products are provided that facilitate improved communication between the ICs of a multi-IC system. The inventive arrangements provide bridge circuits and methods of operations for such circuits capable of establishing low latency, high-speed serial communication links between the ICs in the system.

The example bridge circuit described within this disclosure may be used to implement any of a variety of different multi-IC systems. In one or more example implementations, the inventive arrangements may be used to implement an emulation system that uses multiple ICs to emulate circuitry of a circuit design. The inventive arrangements described herein alleviate the bottleneck imposed by conventional inter-IC communication within multi-IC systems, including emulation systems. Unlike conventional emulation systems that implement inter-IC communications using Select I/O, for example, the inventive arrangements described herein utilize high-speed serial transceivers to communicate between ICs.

Select I/O refers to a class of input/output pins that can be driven high (VCC) or low (GND) directly through Register Transfer Level (RTL) code. In some ICs, Select I/O pins may be grouped in clusters called banks. The Select I/Os may be configured to operate at different voltages thereby allowing the IC to communicate with a range of different devices. Select I/Os are limited in terms of speed of operation to a range of approximately 500 MHz to 1.6 GHz. By comparison, the examples described herein utilizing multi-gigabit transceivers are capable of operating at speeds ranging from approximately 500 MHz to 28 GHz. Further aspects of the inventive arrangements are described below in greater detail with reference to the figures.

In one or more example implementations, a bridge circuit is provided that is capable of high-speed communication over serial communication links. The bridge circuit may be disposed in two or more different ICs to facilitate communication between the ICs. In one aspect, a circuit design may be partitioned for implementation in a plurality of ICs of a multi-IC system. The circuit design may be partitioned according to on-chip bus interconnects within the circuit design. Each of the resulting partitions of the circuit design may be implemented in a different IC of the system with one or more bridge circuits implemented therein to allow the partitions to communicate across IC boundaries. Though not cycle accurate, the serial communication links established by the respective bridge circuits provide increased system performance. Whereas two partitions of the circuit design, when implemented in a same IC, communicate synchronously, in accordance with the inventive arrangements described herein, the two partitions, when implemented in different ICs of a multi-IC system, communicate asynchronously.

The inventive arrangements described within this disclosure allow a circuit design to be partitioned as described herein and implemented across a plurality of interconnected ICs without incurring a penalty on performance. For example, in conventional cases where a circuit design is partitioned for implementation across multiple, different ICs, the resulting implementation suffers from latencies that arise from the use of Select I/Os and latencies inherent to printed circuit board (PCB) signal routing. These latencies reduce the overall performance (e.g., speed) of the resulting implementation for a partitioned design. The maximum speed of Select I/Os within ICs, for example, is presently about 3.2-3/4 Gbps. By comparison, the multi-gigabit transceivers described herein may be clocked at approximately 28 Gbps, which provides a significant performance (e.g., speed) boost to the resulting multi-IC implementation. Further performance gains may be achieved by grouping (e.g., "clubbing") together multiple ones of communication channels using the multi-gigabit transceivers to surpass the performance of Select I/Os. The inventive arrangements described herein may also provide a level of performance for a circuit design that is partitioned as described herein and implemented across a plurality of different ICs that rivals that of an unpartitioned version of the circuit design implemented in a single, monolithic IC.

FIG. 1 illustrates an example of a system 100. System 100 is an example of a multi-IC system. In one example, system 100 is an emulation system used to emulate a circuit design for an IC. The circuit design may be for a System-on-Chip (SoC) type of IC, for one or more Intellectual Property (IP) cores, or for any portion of a larger electronic system that may be under development. In one or more example implementations, the circuit design may be for an IP core or a portion of a circuit design that has input(s) and/or output(s) to couple to other systems that are located off-chip. As an illustrative and non-limiting example, the circuit design may be for a video codec. The circuit design may be specified as an RTL description such as a netlist or using a hardware description language. The circuit design being emulated is typically too large to be emulated by a single IC (e.g., a single programmable IC) thereby necessitating the need for a multi-IC system such as system 100.

In the example of FIG. 1, system 100 includes a processor 102 coupled to a memory controller 104. Memory controller 104 is capable of accessing, e.g., reading and/or writing, a random-access memory (RAM) 106. RAM 106 may be implemented as any of a variety of different types of RAM. For example, RAM 106 may be implemented as one or more banks of Double Data Rate Synchronous Dynamic Random-Access Memory. Processor 102 is coupled to a bridge circuit 108. Bridge circuit 108 couples to bridge circuit 110 and to bridge circuit 114. Bridge circuit 110 couples to a partition 112 of the circuit design. Bridge circuit 114 couples to a partition 116 of the circuit design.

In the example of FIG. 1, emulation system 100 is illustrated with partitions 112 and 116. It should be appreciated that further partitions may be emulated by system 100 through inclusion of further bridge circuits coupled to such other partitions. In addition, in some example implementations, a further partition may be implemented by processor 102 (e.g., as software) or implemented in programmable circuitry in the same IC as processor 102. The inventive arrangements are not intended to be limited by the number of partitions. For example, in some implementations, two ICs, each including a partition, may communicate by way of bridge circuits located in each IC. In another example, an IC including a processor coupled to a bridge circuit may communicate with another IC having a partition implemented therein by way of a bridge circuit in the other IC.

Figure 2A:
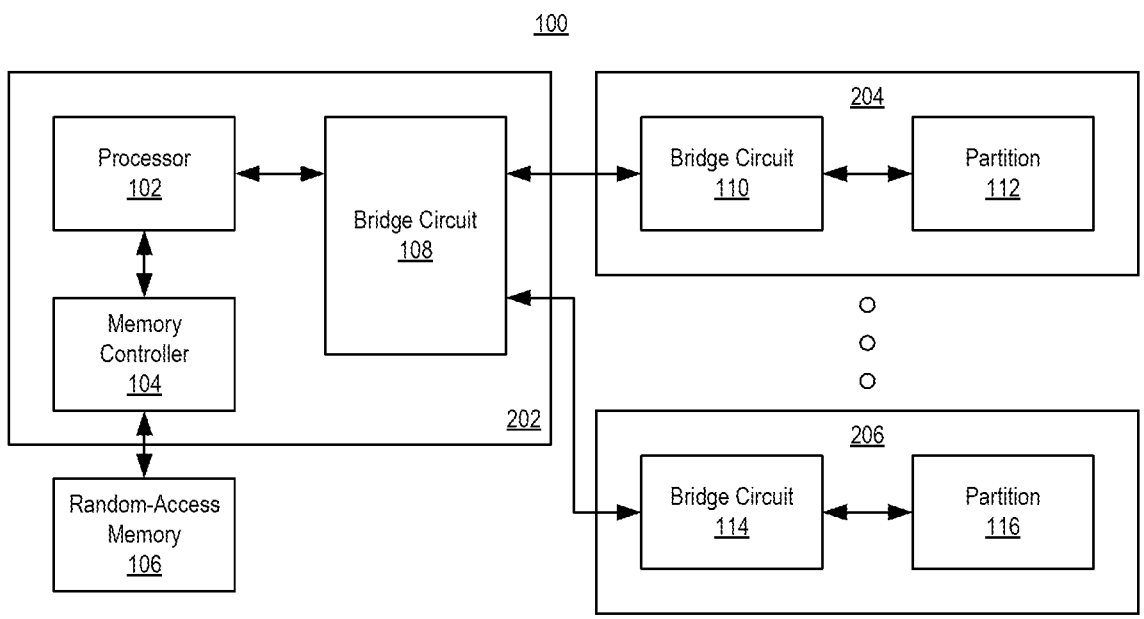
FIG. 2A illustrates another example of a system including multiple ICs.

FIG. 2A illustrates another example of system 100. In the example of FIG. 2A, processor 102, memory controller 104, and bridge circuit 108 may be disposed in a same IC 202. Bridge circuit 110 and partition 112 may be disposed in an IC 204. Bridge circuit 114 and partition 116 may be disposed in an IC 206.

In one aspect, ICs 202, 204, and 206 may be programmable ICs. A programmable IC is an IC that includes at least some programmable circuitry. Programmable logic is a type of programmable circuitry. Examples of programmable ICs may include, but are not limited to, Field Programmable Gate Arrays (FPGAs), System-on-Chips (SoCs) having at least some programmable circuitry (e.g., programmable logic), Application-Specific ICs including at least some programmable circuitry, or other types of ICs that include programmable circuitry. For example, partitions 112, 116 may be implemented in programmable circuitry with respective ICs 204, 206.

In one or more example implementations, bridge circuits 108, 110, and 114 and/or other bridge circuits described within this disclosure may be implemented using programmable circuitry. As an example, bridge circuits may be provided or made available as parameterizable IP cores. In this regard, the bridge circuits are configurable in terms of number of I/O, operating frequency, types of channels that connect to each respective bridge circuit, and/or other parameters.

In other examples, though providing less flexibility and/or programmability, bridge circuits may be implemented as hardwired circuit blocks. In one or more other example implementations, one or more bridge circuits of a system may be implemented using programmable circuitry while one or more other bridge circuits of the same system may be implemented as hardwired circuit blocks.

As defined herein, the term "Intellectual Property core" or "IP core" means a pre-designed and reusable unit of logic design, a cell, or a portion of chip layout design in the field of electronic circuit design. An IP core may be expressed as a data structure specifying a description of circuitry that performs a particular function. An IP core may be expressed using hardware description language file(s), as a netlist, as a bitstream that programs a programmable IC, or the like. An IP core may be used as a building block within circuit designs adapted for implementation within an IC.

An IP core may include additional resources such as source code, scripts, high-level programming language models, schematics, documentation, constraints, and the like. Examples of different varieties of IP cores include, but are not limited to, digital signal processing (DSP) functions, memories, storage elements, math functions, etc. Some IP cores include an optimally floorplanned layout targeted to a specific family of ICs. IP cores may be parameterizable in that a user may enter a collection of one or more parameters, referred to as a "parameterization," to activate or change certain functionality of an instance of an IP core.

In one or more example implementations, one or more of ICs 202, 204, and/or 206 may include one or more subsystems therein. Examples of the subsystems may include a data processing engine array having a plurality of hardwired and programmable data processing engines, a programmable Network-on-Chip (NoC), programmable logic, and/or a processor system having one or more processors and optionally one or more hardwired peripheral circuit blocks. The ICs may also include one or more hardwired circuit blocks (e.g., Application-Specific Hardwired Circuit Blocks).

As discussed, IC 202 may implement a partition of the circuit design (not shown). The partition may be software executing in processor 102 and/or implemented in programmable circuitry (e.g., programmable logic—not shown) that may be included in IC 202 and that couples to processor 102.

Figure 2B:
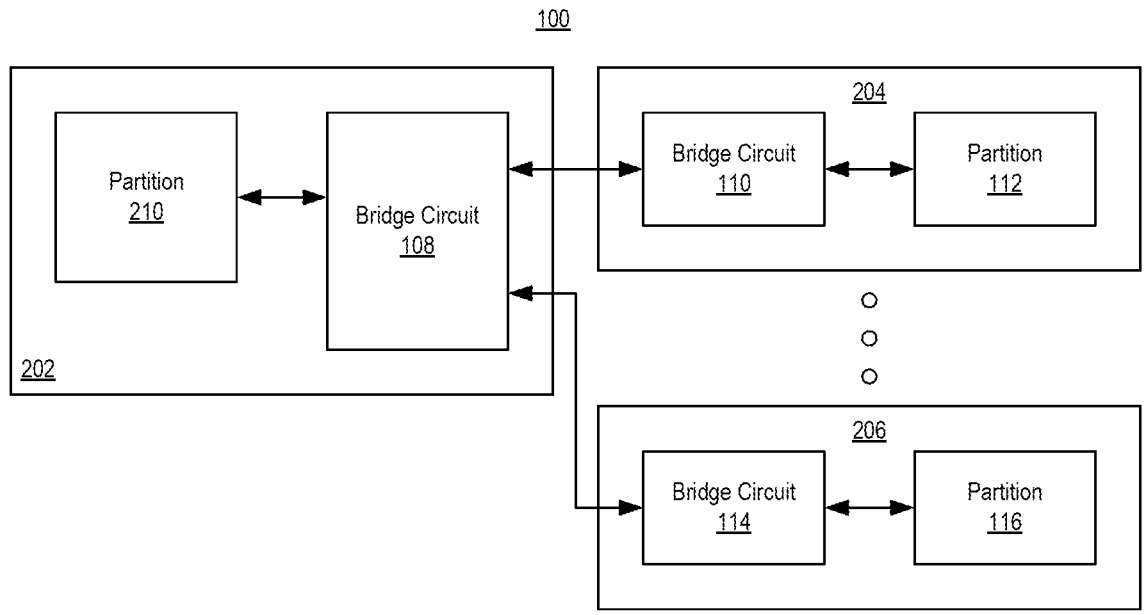
FIG. 2B illustrates another example of a system including multiple ICs.

FIG. 2B illustrates another example of system 100. In the example of FIG. 2B, the processor is omitted. As illustrated, IC 202 includes a partition 210 coupled to bridge circuit 108. As discussed, IC 202 may communicate with one or more other ICs by way of bridge circuit 108.

Figure 3:
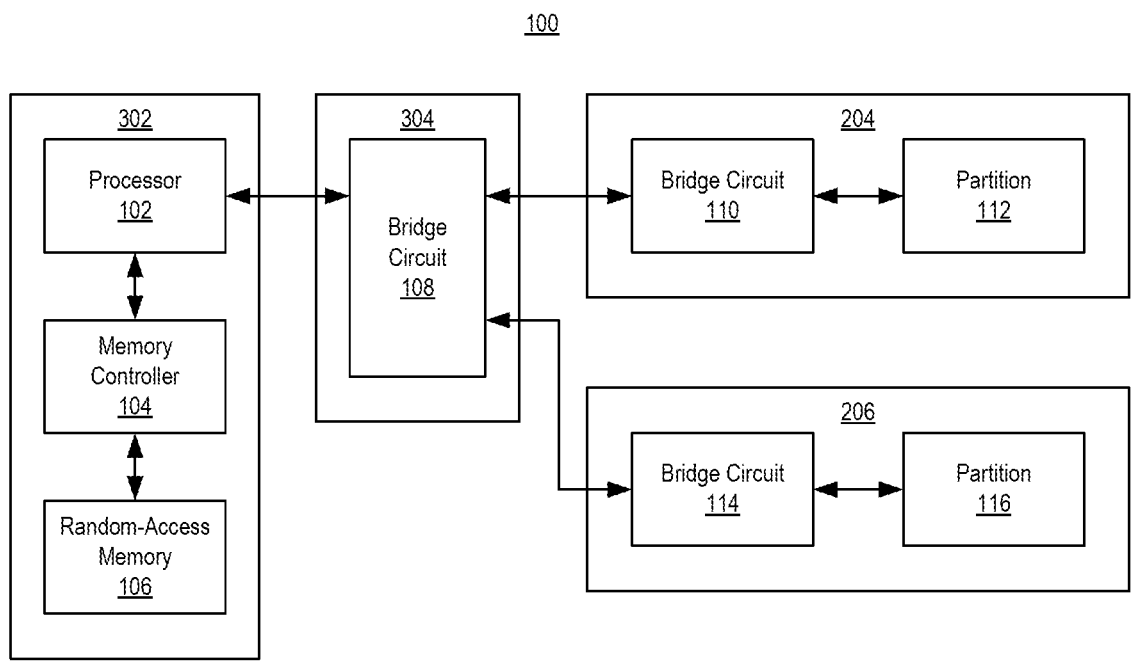
FIG. 3 illustrates another example of a system including multiple ICs.

FIG. 3 illustrates another example of system 100. In the example of FIG. 3, processor 102, memory controller 104, and RAM 106 may be included as part of a data processing system 302, e.g., a computer. For example, processor 102, memory controller 104, and/or RAM 106 may be disposed on a same circuit board (e.g., a motherboard). Bridge circuit 108 may be included in an IC 304. In one aspect, IC 304 may communicate with data processing system 302 by way of a communication bus. In an example implementation, IC 304 may communicate with data processing system 302 via a Peripheral Component Interconnect Express (PCIe) bus. For example, IC 304 may be disposed on a card having a connector (e.g., an edge connector) that may be inserted into an available bus slot of data processing system 302.

ICs 204, 206 may be disposed on separate circuit boards (e.g., cards). The cards with ICs 204, 206 may be disposed in a chassis. The bridge circuit 110 of the card of IC 204 may couple to bridge circuit 108. Similarly, the bridge circuit 114 of the card of IC 206 may couple to bridge circuit 108. In one aspect, one or more or all of bridge circuits 108, 110, and/or 114 may be implemented as hardened circuit blocks. In another aspect, one or more or all of bridge circuits 108, 110, and/or 114 may be implemented using programmable circuitry. In still other examples, one or more of bridge circuits 108, 110, and/or 114 may be hardened while one or more other ones of bridge circuits 108, 110, and/or 114 may be implemented using programmable circuitry.

Figure 4:
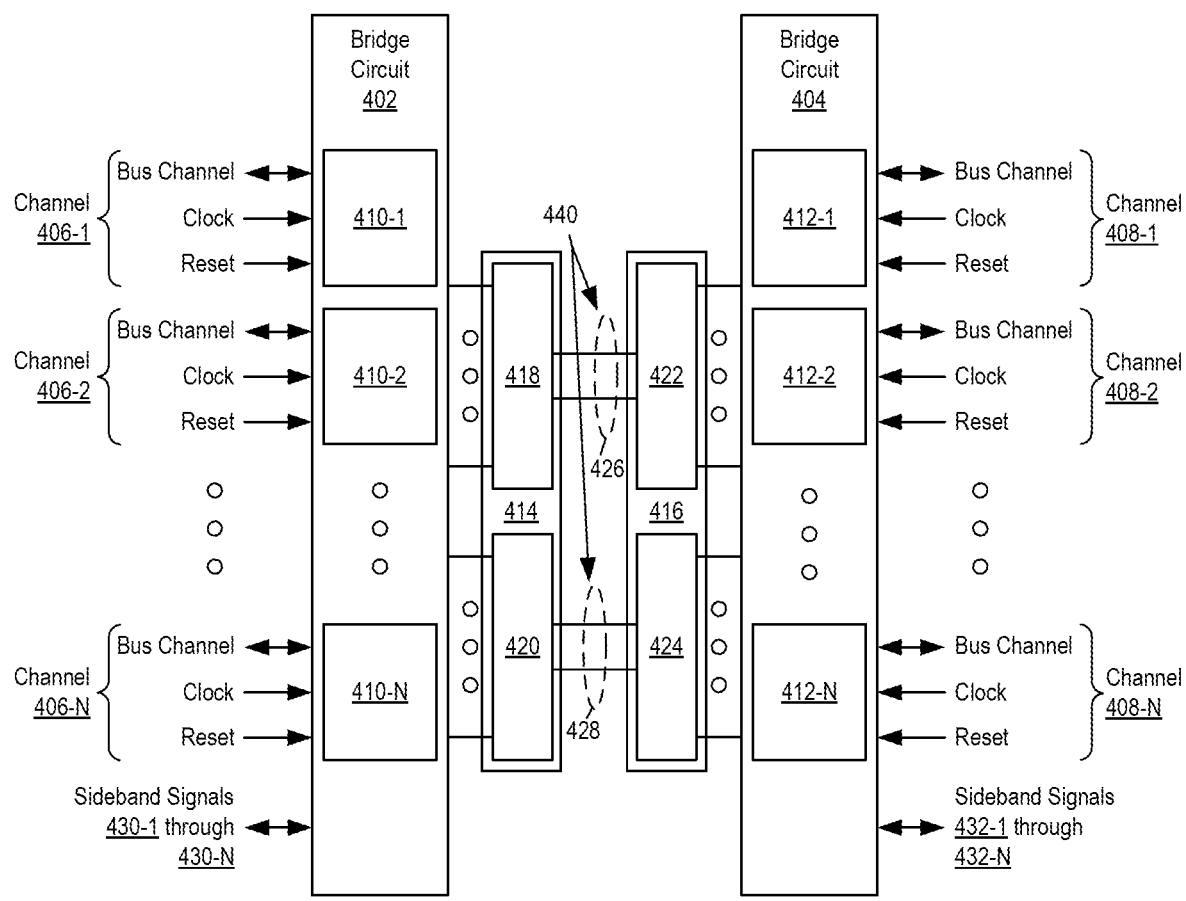
FIG. 4 illustrates communications between example bridge circuits.

FIG. 4 illustrates communications between example bridge circuits 402, 404. Bridge circuits 402, 404 may correspond to any two of the example bridge circuits of FIGS. 1-3.

In the example of FIG. 4, each bridge circuit is capable of coupling to circuitry, e.g., a partition, implemented in the same IC as the bridge circuit, or other circuitry via a plurality of channels. Bridge circuit 402 couples to the circuitry implemented in the same IC via channels 406-1, 406-2, through 406-N. Bridge circuit 404 couples to the circuitry, e.g., a partition, implemented in the same IC via channels 408-1, 408-2, through 408-N. For purposes of illustration, each bridge circuit is capable of connecting with 16 different channels (e.g., N=16). The inventive arrangements disclosed herein are not intended to be limited by the particular number of channels to which each bridge circuit is connected. A bridge circuit may connect to fewer or more channels depending on the parameterization, for example.

In one or more examples, where system 100 implements an emulation system, individual channels 406 may be mapped to individual channels 408. For example, channel 406-1 corresponds to channel 408-1 in that prior to partitioning, the pathway from channel 406-1 to channel 408-1 was a synchronous channel such as an on-chip interconnect. For example, the channel of the circuit design that was partitioned to create channel 406-1 and channel 408-1 may have been a memory mapped communication channel or a stream communication channel.

Within this disclosure, the Advanced Microcontroller Bus Architecture (AMBA) and, more particularly, the eXtensible Interface (AXI) (hereafter "AXI") protocol and communication bus is used for purposes of description. AXI defines an embedded, or on-chip, bus interface for use in establishing on-chip connections between compliant circuit blocks and/or systems. AXI is provided as an illustrative example of a bus interface and is not intended as a limitation of the examples described within this disclosure. It should be appreciated that other similar and/or equivalent protocols, communication buses, bus interfaces, and/or interconnects may be used in lieu of AXI and that the various example circuit blocks and/or signals provided within this disclosure will vary based on the particular protocol, communication bus, bus interface, and/or interconnect that is used.

In the example of FIG. 4, each channel 406, 408 includes a bus channel that includes one or more sub-channels, a clock signal for the channel, and a reset signal for the channel. Each channel 406, 408 is a parallel data channel conveying multiple bits of data over a plurality of wires in parallel each clock cycle. Each channel 406, 408 operates in a particular clock domain defined by the clock signal of the channel. The clock and reset signals are not conveyed from one bridge circuit to another, but rather are used in the signal processing performed by the respective bridge circuits to perform clock domain conversion of the data into and/or out from the clock domain of the bridge circuit(s).

The interface for each channel 406, 408 is controlled by independent clock and reset ports. The interfaces for channels 406 may be driven with one set of clock frequencies, while the interfaces for channels 408 may be driven by another set of clock frequencies that are independent of those of channels 406. Further, the clock signals provided to different ones of channels 406 (e.g., 406-1, 406-2, and/or 406-N) may differ in frequency as may the clock signals provided to different ones of channels 408. To match performance, clocks provided to the interfaces should be matched to the line rate on serial channel 440. For example, if the line rate of serial transmit link 426 is 28 Gbps and the width of channel 406-1 is 512 bits, the interfaces should be driven at approximately 50 Mhz or higher. More particularly, the interfaces should be driven at 54.6875 Mhz.

Each bus channel of channels 406 and/or 408 may be a particular bit-width. Bus-channels of channels 406 may be of different bit-widths. Bus channels of channels 408 may be matched to the corresponding ones of the bus channels of channels 406 in terms of bit-width. For example, the bus channels of channels 406 may be 16, 32, 64, 128, 256, or 512 bits in width. Corresponding bus channels of channels 408 will be matched in terms of bit-width. For purposes of illustration, it can be assumed that channel 406-1 and 408-1 are paired, channels 406-2 and 408-2 are paired, etc. That is, channel 406-1 and 408-1 may have been a single, synchronous channel in the original circuit design prior to partitioning and implementation in system 100. As implemented in system 100, the synchronous channel is partitioned or divided and implemented as a serial asynchronous channel between bridge circuits 402, 404.

Bridge circuit 402 includes a plurality of transceivers 410. Bridge circuit 402 includes one transceiver 410 for each channel 406. Bridge circuit 404 includes a plurality of transceivers 412, e.g., one for each channel 408. Each transceiver 410, 412 is capable of performing clock domain conversion, data width conversion, and packetization/depacketization. Data packetized by transceivers 410 are conveyed to a multigigabit (MG) transceiver 414, where each transceiver 410 conveys the resulting packets to MG transceiver 414 via a separate data path. Data received by MG transceiver 414 from another IC is conveyed to the corresponding transceiver 410. Referring to bridge circuit 404, data packetized by transceivers 412 is conveyed to MG transceiver 416, where each transceiver 412 conveys the resulting packets to MG transceiver 416 via a separate data path. Data received by MG transceiver 416 from another IC is conveyed to the corresponding transceiver 412.

MG transceiver 414 includes an MG transmitter 418 and an MG receiver 420. MG transceiver 416 includes an MG receiver 422 and an MG transmitter 424. MG transmitter 418 is capable of serializing data received from transceivers 410 and outputting serialized packets over serial transmit link 426. Serial transmit link 426 may be a differential serial output, e.g., a differential pair. In one or more example implementations, MG transmitter 418 is capable of outputting data using a selected type of encoding. An example encoding that may be used by MG transmitter is NRZ encoding. MG receiver 422 is capable of receiving packets over serial receive link 426, deserializing the received packets, and providing the packets to transceivers 412. MG transmitter 424 and MG receiver 420 are capable of operating similar to, or the same as, MG transmitter 418 and MG receiver 422, respectively.

It should be appreciated that the terms transmit and receive in reference to the serial links are used for purposes of illustration and to differentiate one channel from another. Each such channel may convey data for a variety of different channels and sub-channels (e.g., master and/or slave) depending on the particular circuitry implemented in the various partitions communicatively linked by bridge circuits.

In the example of FIG. 4, bridge circuit 402 receives and/or drives one or more sideband signals 430. Bridge circuit 404 receives and/or drives one or more sideband signals 432. In one aspect, sideband signals are signals that are associated with one or more of the channels 406, 408, but that are not defined by the particular communication protocol of the respective channels. Examples of sideband signals include interrupt signals and low bandwidth signals. Though shown separately, sideband signals 430 corresponding to channels 406 and sideband signals 432 corresponding to channels 408 may be provided to the respective transceivers 410, 412 for the particular channel 406, 408 to which the sideband signals correspond.

Each bridge circuit 402, 404 is capable of reproducing signals from data received from the other bridge circuit in the same format as originally received by the other bridge circuit. The bridge circuits effectively playback the originally received signals over the respective channels. Because serial link 440, referring to serial transmit link 426 and serial receive link 428, between the bridge circuits is asynchronous and not cycle accurate, the portions of the circuit design in the respective ICs need not operate at the same clock rate or data rate.

For example, consider a case where a first partition and a second partition of a circuit design are configured to communicate with one another over a synchronous communication channel when implemented in an IC. The first partition and the second partition operate at the same clock rate. When the partitions are implemented in different ICs and communicate asynchronously using bridge circuits as described herein, the partitions may operate at different clock frequencies. Each partition, for example, may operate at the fastest possible clock speed or rate without being constrained by the operating speed of the other partition. This allows the circuit design to operate or be emulated faster and more efficiently than would otherwise be the case.

Figure 5:
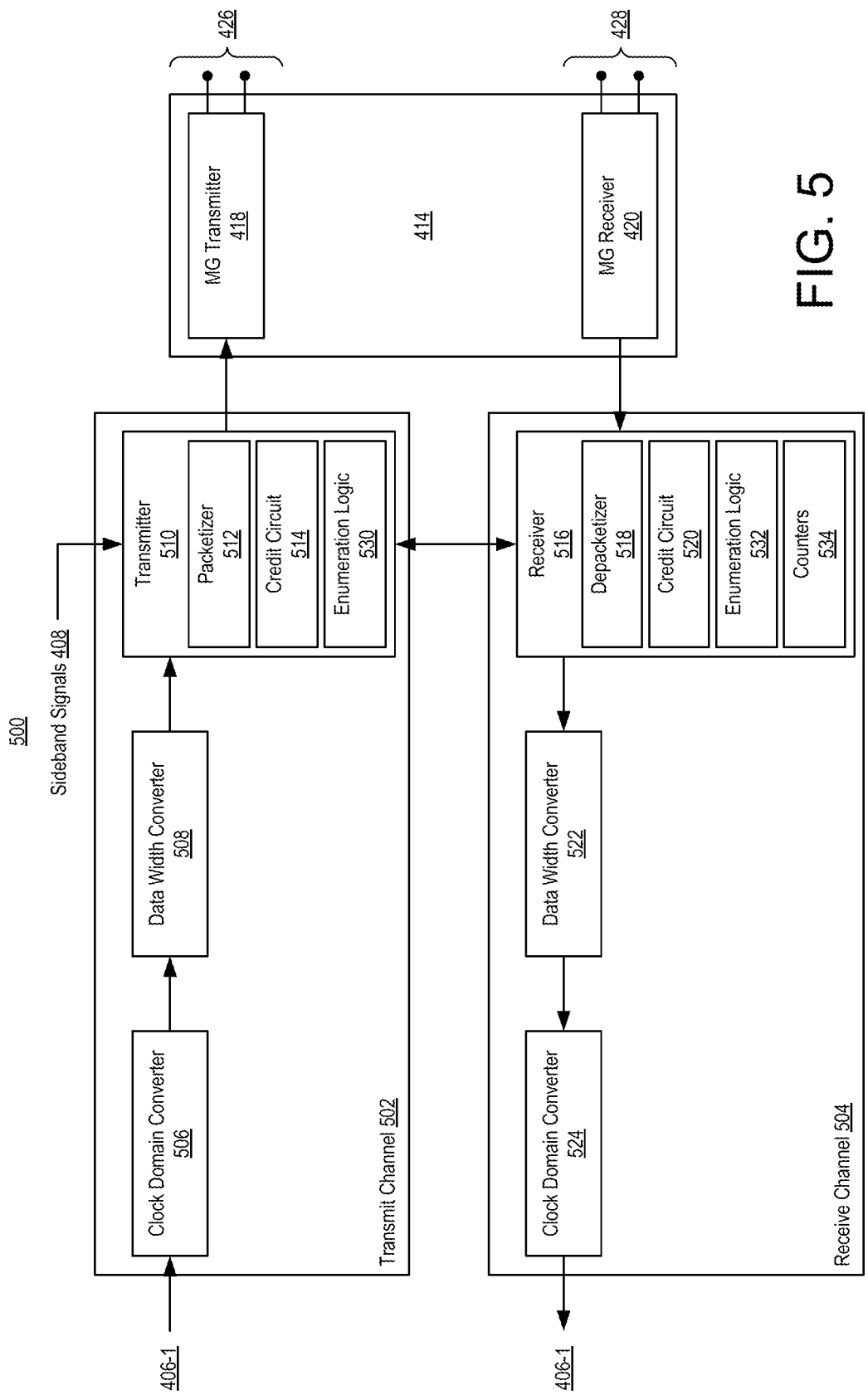
FIG. 5 illustrates an example architecture for a transceiver of a bridge circuit.

FIG. 5 illustrates an example circuit architecture 500 for a transceiver of a bridge circuit. Architecture 500 may be used to implement the transceivers 410, 412 of the various bridge circuits described herein in connection with FIGS.

1-4. For example, each channel coupled to a bridge circuit may be coupled to a transceiver having an architecture 500.

In the example of FIG. 5, architecture 500 includes a transmit channel 502 and a receive channel 504. Transmit channel 502 includes a clock domain converter 506, a data width converter 508, and a transmitter 510. Transmitter 510 includes a packetizer 512, a credit circuit 514, and enumeration logic 530. Receive channel 504 includes a receiver 516, a data width converter 522, and a clock domain converter 524. In some example implementations, data width converter 522 and clock domain converter 524 may be omitted. In some other example implementations, clock domain converter 506 and data width converter 508 may be omitted. Receiver 516 includes a depacketizer 518, a credit circuit 520, enumeration logic 532, and a plurality of counters 534.

Clock domain converter 506 is capable of converting signals from the clock domain of the channel to that of the transceiver or bridge circuit, thereby allowing signals from the clock domain of the channel to be received by the transmit channel. Clock domain converter 524 is capable of converting signals from the clock domain of the bridge circuit to that of the channel, thereby allowing signals from the clock domain of the bridge circuit to be output to the clock domain of the channel.

Data width converter 508 is capable of converting the bit-width of received sub-channels into a desired or selected width for purposes of packetizing data. In an example implementation, data width converter 508 is capable of receiving one or more sub-channels of data having widths of 16, 32, 64, 128, 256, or 512 and converting the width to a selected width of 64 bits. Sub-channels having a width of 64 may be left unaltered. Appreciably, different channels may have different widths. In the example implementations described herein, packets have a standard size including a 64-bit data or payload portion. It should be appreciated that the example bit widths for both the received data and the result after conversion are provided for purposes of illustration. Other bit widths may be used for data on the sub-channels and for the resulting bit width post conversion.

Data width converter 522 is capable of converting the bit-width of data received from receiver 516 into sub-channels having a bit-width corresponding to the particular sub-channels connected thereto. Thus, data width converter 522 effectively converts 64 bits of data, as extracted from received packets, into data having widths of 16, 32, 64, 128, 256, or 512 bits. Data having a width of 64-bits may be left unaltered. In other examples, data may be converted to 16-bits or 32-bits in width. The particular bit width to which data is converted will depend on the line rate that is used on MG transmitters 418, 424 and MG receivers 422, 420.

In one aspect, data from MG receiver 420 may be conveyed to each receiver 516 with each receiver 516 being configured to detect the packets directed to that particular receiver (e.g., using a channel number described in connection with FIG. 6).

Referring to transmitter 510, packetizer 512 is capable of generating packets of data from the data width converted data received from data width converter 508. Packetizer 512 may convey generated packets of data to MG transmitter 418 for transmission to another IC. Credit circuit 514 is capable of regulating the flow of packets sent from packetizer 512 based on an amount of credit provided from the paired receiver in the receiving bridge circuit as received via credit circuit 520 in receiver 516. Referring to receiver 516, depacketizer 518 is capable of depacketizing packets received from MG receiver 420. That is, depacketizer 518 is capable of extracting the data from the packets and providing the extracted data, e.g., 64-bits to data width converter 522.

As an illustrative example, channel 406-1 is coupled to transmit channel 502 and to receive channel 504. In the case where channel 406-1 is a memory mapped channel, master sub-channels (e.g., write address sub-channel, read address sub-channel, and write data sub-channel) are coupled to transmit channel 502, while slave sub-channels (e.g., read data sub-channel and write response sub-channel) are connected to receive channel 504.

Data transmitted via transmit channel 502 via MG transmitter 418 is reconstructed from the serial transmit link in the receiving bridge circuit and conveyed over the corresponding sub-channels of channel 408-1. The data will have the original bit-width, e.g., the same as that of the sub-channels of channel 406-1. The data may be played back at the same or a different clock speed than channel 406-1. As noted, data is conveyed at a significantly higher rate over serial transmit link 426 than either of channels 406-1 or 408-1. It should also be appreciated that the clock domain of channels 406-1 and 406-2, etc., for example, may be the same or different.

For example, a corresponding receive channel in the receiving bridge circuit will output the data corresponding to the master sub-channels (e.g., write address sub-channel, read address sub-channel, and/or write data sub-channel) to the partition coupled thereto.

Data received via MG receiver 420 (e.g., from slave sub-channels of channel 408) via receive serial link 428 may be reconstructed and output via clock domain converter 524 with the original bit-width, e.g., the same as that of the sub-channels of channel 408-1. The data may be played back via sub-channels of channel 406-1 at the same or a different clock speed than channel 408-1.

For example, a corresponding transmit channel in the receiving bridge circuit will output the slave sub-channels (e.g., read data sub-channel and/or write response sub-channel) to MG transmitter 424 as packetized data. MG transmitter 424 conveys the packets over serial receive link 428. Receive channel 504 receives the packets and outputs data corresponding to the read data sub-channel and the write response sub-channel to the partition coupled thereto.

In the case where channel 406-1 is a stream channel, the stream channel may be connected to transmit channel 502. In an example implementation where data flows unidirectionally from transmit channel 502 (e.g., in a first IC) to a corresponding receive channel 504, albeit in a second IC, architecture 500 may be implemented in a transmit only mode where architecture 500 is implemented with clock domain converter 524 and data width converter 522 being omitted from receive channel 504. For example, in terms of the bridge circuit being available as an IP core, such circuit blocks may be omitted when the IP core is instantiated. In this example, the second IC still may transmit interrupts to the first IC by way of sideband signals that are received by receiver 516 and output to circuitry in the first IC. Further, receiver block 516 still may be used for purposes of link-up and performing credit exchanges.

The circuit architecture 500, as implemented in the second IC, may be implemented in a receive only mode where the clock domain converter 506 and the data width converter 508 of the transmit channel 502 of the second IC may be omitted. In that case, data width converter 522 and clock domain converter 524 of the receive channel 504 still are included in receive channel 504 in the second IC. Appreciably, transmitter 510 in the second IC may still convey sideband signals from the second IC to the first IC despite not including data width converter 522 and clock domain converter 524.

Continuing with the example where channel 406-1 is a stream channel and second IC does send data back to the first IC, the circuit architecture 500 in each respective IC may be implemented as illustrated in FIG. 5.

In still one or more other example implementations, streaming and/or memory mapped data conveyance may be disabled in architecture 500 while maintaining enablement (e.g., operation) of sideband communications. In such cases, clock domain converter 506, data width converter 508, data width converter 522, and clock domain converter 524 may be removed or omitted. In the case of transmitting sideband signals only, transmit channel 502 need only include transmitter 510 while receive channel 504 need only include receiver 516.

In the example of FIG. 5, sideband signals 430-1, e.g., only those sideband signals corresponding to channel 406-1, are provided directly to transmitter 510. For example, sideband signals 430-1 of channel 406-1 may be provided directly to packetizer 512. Packetizer 512 is capable of generating management packets of the sideband signals and transmitting the management packets of sideband signals in response to determining that no data is received over channel 406-1 via clock domain converter 506 and data width converter 508. That is, transmitter 510 is capable of sending management packets of sideband signals in response to determining that there is no data from the corresponding channel (e.g., bus channel) to convey.

In the example of FIG. 5, the architecture of a single transceiver is illustrated. It should be appreciated that in the case of a bridge circuit, multiple instances of architecture 500, e.g., one for each channel, may be included. Each such instance will connect to an MG transceiver. That is, with N channels connected to a bridge circuit, MG transmitter 418 will have an incoming data path from each of the N transmit channels. MG transmitter 418 may include arbitration logic for selecting data from the N transmit channels for serialization and transmission. MG receiver 420 will have an outgoing data path to each of the N receive channels. As noted, MG receiver 420 may broadcast the data to each of the N receive channels where each of the N receive channels only accepts data intended for that channel.

In the example of FIG. 5, it should be appreciated that each architecture 500 implemented in a bridge circuit may be adapted to the particular type of channel being processed (e.g., stream or memory mapped) and whether communication is unidirectional or bi-directional. Further, an architecture for a transceiver implemented in one bridge circuit will match or complement the corresponding transceiver for the corresponding channel in a paired bridge circuit. For example, a transceiver (410-1) configured for a stream (memory mapped) channel is paired with another transceiver (412-1) also configured for a stream (memory mapped) channel.

FIG. 6 illustrates an example of a packet that may be generated by a packetizer of a bridge circuit. For example, packetizer 512 may generate packets as illustrated in FIG. 6. In the example, packet 600 includes a packet identifier (ID) 602, a channel number 604, a sequence number 606, a packet size 608, data 610, and an error code 612. The example packetization illustrated in FIG. 6 allows multiple communication channels, whether stream, memory mapped, and sideband signals, and any combination thereof, to be conveyed over serial transmit link 426 and serial receive link 428.

Each of serial transmit link 426 and serial receive link 428 between bridge circuits may be divided into a plurality of virtual channels. For example, the physical serial link may have two virtual channels including a data virtual channel and a management virtual channel. The packet ID 602 of each packet indicates the particular virtual channel over which the packet is conveyed. Data traffic conveyed over one of channels 406, 408 is packetized with a packet ID 602 indicating the data virtual channel. Other information referred to as link management data may be packetized with a packet ID indicating the management virtual channel. Link management data includes, for example, heartbeat, credit exchange data, and interrupts (sideband signals). In one aspect, the packet ID 602 may be indicated by a single bit indicating the virtual channel to which the packet belongs, e.g., 0 indicating management virtual channel and 1 indicating data virtual channel. The packet ID 602 may be followed by a SOF (Start of Frame) indicator or bit pattern.

Channel number 604 specifies information about the particular channel from which the packet was generated. That is, the channel number 604 may specify a particular channel number and a type of the channel. For example, since each bridge circuit may be coupled to 16 different channels, the channel number 604 may specify a number from 1-16 corresponding to the channel to which the packet corresponds. Each channel number 604 is also associated with a particular type of channel, e.g., memory mapped or stream. For example, a channel 1 may be used to identify packets corresponding to channel 406-1 and 408-1 (e.g., as these channels correspond to one another and are mapped to one another). A channel 2 may be used to identify packets corresponding to channel 406-2 and 408-2, etc.

In the case of a memory mapped channel, e.g., an AXI memory mapped channel, each such channel includes 5 sub-channels. Each of the 5 sub-channels is a stream channel. The sub-channels of a memory mapped channel include an address write sub-channel, a write data sub-channel, a write response sub-channel, an address read sub-channel, and a read data channel. The address write sub-channel, write data sub-channel, and address read sub-channel are masters. The read data sub-channel and the write response sub-channel are slaves. The data from each of these sub-channels may be packetized as individual packets. That is, for a given clock cycle, the data of one sub-channel is placed in a packet, while the data for other sub-channels are placed in different packets. The packets generated from sub-channels of a same channel will have a same channel number 604 (where the channel number is unique among the channels). That is, for a given memory mapped channel, packets for the address write sub-channel, packets for the write data sub-channel, packets for the write response sub-channel, packets for the address read sub-channel, and packets for the read data channel will each have the same channel number 604.

In the case of a stream channel, e.g., an AXI stream channel, each stream channels includes one stream (e.g., has a single sub-channel). That stream may be assigned a unique channel number that is specified as the channel number 604 in packets that are generated for data conveyed over the stream.

For example, referring to FIG. 4, channel 406-1 may be a memory mapped channel. In that case, bridge circuit 402 packetizes and conveys data from the sub-channels considered to be masters to bridge circuit 404 over serial transmit link 426. Bridge circuit 404 receives the packets, depacketizes the data, and conveys the data over the corresponding master sub-channels of channel 408-1. Bridge circuit 404 packetizes data from the sub-channels of channel 408-1 considered to be slaves and conveys the data to bridge circuit 402 via serial receive link 428. Bridge circuit 402 depacketizes the data and conveys the data over the corresponding slave sub-channels of channel 406-1. As discussed, serialization and deserialization may be performed by MG transceivers.

In another example, AXI memory mapped signals are broken down into the 5 sub-channels previously described. The channels are sliced into independent stream channels. The read address sub-channel, the write address sub-channel, and the write data sub-channel drive data from master to slave whereas the write response sub-channel, and read data sub-channel drive data from slave to master. On the master side, the bridge circuit slices the AXI memory mapped channel into AXI streams and transmits the serialized data over the serial transmit link. On the receiving side, the bridge circuit depacketizes the data and converts the data into an AXI memory mapped channel to convey the data to the coupled circuitry. In one aspect, each depacketizer may be configured to recognize the data therein and determine the particular sub-channel to which the packet corresponds.

In one aspect, channel number 604 is included in the packets that are generated automatically by a Media Access Control Sublayer or MAC portion of the bridge circuit architecture (e.g., in packetizer 512). Users may not overwrite or assign specific or different channel numbers for the channels. This mechanism safeguards against incorrectly routing packets between memory mapped and stream channels at opposing bridge circuits.

In another aspect, the channel number 604 of each packet may be used to prioritize traffic within the MAC and may be used to assign a weight for the packet using a scheduler. As multiple channels are multiplexed over a single physical link (e.g., serial communication link), some of the channels may require a minimum Quality of Result (QOR) or priority handling for the system to function properly. As an illustrative example, if video streams are being multiplexed with standard Direct Memory Access (DMA) data traffic, the video may stall in cases where the DMA is moving a relatively large amount of data between a source and a destination over a serial transmit/receive link. This can result in intermittent video stall and can cause jitters in display. The packets of the video streams may be assigned a higher QOR or prioritization to prevent intermittent video.

While some channels, e.g., AXI memory mapped channels, define QOS signals that may be used to prioritize one interface over another, in the examples described herein, the prioritization is handled using the channel numbers 604, which are based on the implementation of the circuit designs partitioned in the system.

Sequence number 606 is a number that is incremented sequentially for each packet that is sent over the serial link 440. Each packet has a unique sequence number 606, at least until the sequence numbers roll over after a maximum value. In the case where a corrupt packet is received by a bridge circuit, e.g., the receiver therein, the bridge circuit may issue a management packet via the management virtual channel to the sending bridge circuit requesting that a particular packet, identified by sequence number 606, be resent. The receiver, for example, may instruct the transmitter to issue the request. Unlike other protocols there is no need to discard packets received after receiving a corrupt packet. Only the corrupt packet needs to be retransmitted. Subsequent to resending the corrupt packet, the sending bridge circuit resumes normal operation.

Packet size 608 specifies the total size of the packet. Data 610 refers to the payload or content of the packet. Error code 612 may be any of a variety of error detection and/or correction codes that allow the receiving bridge circuit to detect a mismatch in the data that is sent and received. In one aspect, error code 612 may be implemented as one or more Cycle Redundancy Checks (CRCs) or one or more parity bit(s).

FIG. 7 is a table 700 illustrating certain operative features of credit-based data transfers implemented between bridge circuits. In one or more example implementations, a sending bridge circuit coupled to a receiving bridge circuit over a serial link may send data to the receiving bridge circuit if sufficient credits are available. A credit circuit such as credit circuit 520 in the receive channel of a receiving bridge circuit, for example, is capable of communicating with credit circuit 514 of the transmit channel of the receiving bridge circuit to issue credits to the sending bridge circuit as link management data (e.g., packets) conveyed over the management virtual channel. Transmission of data packets from the sending bridge circuit to the receiving bridge circuit is gated by the credit flow. A credit-based data transfer ensures that data is not lost due to throttling (e.g., inserting a delay in reading data from a buffer). Further, credit-based data transfers ensure that the data buffer in the receiving bridge circuit does not overflow.

In response to the bridge circuits enumerating the serial communication links, the receiving bridge circuit is capable of sending a management packet on the management virtual channel issuing credits to the sending bridge circuit. In response to receiving the credits (e.g., in the credit circuit 520 of the receive channel in the sending bridge circuit), the sending bridge circuit asserts ready and initiates a data transfer. The credit mechanism ensures that shallow buffers at the receiving bridge circuit do not overflow in the case of backpressure.

The credit mechanism, however, may inhibit performance if the issuance of credit to the sending bridge circuit has the unintended consequence of throttling data. As an example, consider the case where the receiving bridge circuit issues 10 credits to the sending bridge circuit. Only after receiving 10 packets does the receiving bridge circuit issue further credits to the sending bridge circuit. Such a credit mechanism may induce delays and result in throttling of the data over the serial link.

In accordance with the inventive arrangements described herein, the receiving bridge circuit is capable of issuing more credits to the sending bridge circuit before the sending bridge circuit runs out of credits. This allows the sending bridge circuit to continually send packets of data so long as space in the receiving bridge circuit is available rather than stalling while awaiting additional credits.

In one or more example implementations, the receiver 516 may include two separate counters (e.g., counters 534). A first counter is configured to count incoming packets. The second counter is configured to count packets read by the user circuitry (e.g., the circuitry of the partition of the circuit design implemented in the same IC as the receiving bridge circuit). In one or more example implementations, the credit circuit in a receiver may compute a value according to the following expression: (Buffer Capacity)−(Packets Written)+(Packets Read)−(Remaining Credits). In response to determining that the value computed using the foregoing expression exceeds a threshold, the credit circuit of the receiver in the receiving bridge circuit may cause further credits to be provided to the sending bridge circuit (e.g., to the paired transmitter in the sending bridge circuit). The credit circuit of the receiver may signal the credit circuit in the transmitter to issue further credits to the sending bridge circuit.

Table 700 illustrates an example scenario for credit-based data transfers. For purposes of illustration, the receiving bridge circuit has a buffer with 128 available slots to store 128 packets from the sending bridge circuit. Initially, as indicated by row 1, the write counter and the read counter both are 0 with the free space in the buffer being 128 slots. As illustrated in row 1, the receiving bridge circuit issues 128 credits to the sending bridge circuit.

Referring to row 2, after some time, 20 packets have been written using 20 of the 128 issued credits leaving 108 available credits for the sending bridge circuit. The write counter value of 20 reflects this state. The read counter indicates that 8 packets have been read from the buffer. This means that the free space in the buffer of the receiving bridge circuit is 128−20+8=116 slots. Thus, the sending bridge circuit has sent 20 packets as counted by the write counter. The user circuitry has read 8 packets from the buffer as indicated by the read counter.

In one or more examples, the receiving bridge circuit may wait until more than a threshold number of credits may be issued to the sending bridge circuit before actually issuing the credits to the sending bridge circuit. As an illustrative and non-limiting example, the receiving bridge circuit may wait until 64 or more credits can be issued to the sending bridge circuit as a condition for actually issuing credits to the sending bridge circuit. In this example, the threshold of 64 corresponds to having 50% of the buffer in the receiving bridge circuit being free or available.

It should be appreciated that other thresholds may be used. Referring to the state illustrated in row 2, for example, the receiving bridge circuit may issue up to 8 credits at this time, which corresponds to the number of packets read (e.g., the read counter value). If the threshold were set to 8 or less, the receiving bridge circuit could issue credits.

After more time passes, row 3 indicates that 80 packets have been written and 50 packets have been read out by the user circuitry. Thus, 80 of the 128 credits issued to the sending bridge circuit have been used leaving 48 credits still available. Because 50 packets have been read out, 98 available slots exist in the buffer (e.g., 128−80+50=98). The number of credits that the receiving bridge circuit may potentially send is 50 (128−80+50−48=50). In this example, since the number of credits that may be issued is below the threshold of 64, the receiving bridge circuit does not send any additional credits.

After more time passes, row 4 indicates that 90 packets have been written and 70 packets have been read out by the user circuitry. Thus, 90 of the 128 credits issued to the sending bridge circuit have been used leaving 38 credits still available. At the time corresponding to row 4, the receiving bridge circuit is capable of issuing 70 credits (e.g., 128−90+70−38=70). In this example, the number of credits that may be issued by the receiving bridge circuit exceeds the threshold. Accordingly, in response to determining that the amount of credits that may be issued exceeds the threshold, the receiving bridge circuit issues 70 credits. This increases the available credits for the sending bridge circuit to 108 (e.g., 38+70=108).

In the examples described, the number of packets read out of the buffer may be used as the number of credits to issue in cases where that number exceeds the threshold. In other example implementations, the receiving bridge circuit may issue a number of credits corresponding to the amount of free space, e.g., 108 credits. The sending circuit may still apply a threshold in implementations where credits are issued according to free space.

For bridge circuits to communicate over the serial link, the serial link must be enumerated using the enumeration logic included in each transmitter 510 and receiver 516. For example, transmitter 510 includes enumeration logic 530 and receiver 516 includes enumeration logic 532 configured to perform the enumeration related operations described below. In general, the enumeration logic is configured to locate byte boundaries for channel alignment. If alignment cannot be achieved, the alignment starts anew. Thus, prior to communicating data between bridge circuits, e.g., as part of an emulation of a circuit design, the transmitters and receivers that are paired over IC boundaries need to be enumerated and achieve block lock.

In an example implementation and referring to FIGS. 4 and 5, enumeration logic 530 of transmitter 510, e.g., upon power on or upon reset, is capable of transmitting signals as a training pattern referred to as TP1. TP1 is provided to MG transmitter 418 and transmitted via serial transmit link 426 to MG receiver 422. In response to the receiver in the other IC (e.g., a version of receiver 516 and enumeration logic 532) receiving TP1 and aligning with TP1, the enumeration logic of the receiver (e.g., the corollary of receiver 516 and enumeration logic 532) signals the enumeration logic in the transmitter of the other IC (the corollary of transmitter 510 and enumeration logic 530) to transmit a block lock pattern referred to as TP2. TP2 is transmitted by MS transmitter 424 over serial receive link 428 to MG receiver 420. In response to enumeration logic 532 of receiver 516 receiving TP2, enumeration logic 532 signals enumeration logic 530 that TP2 has been received. In response to the signal indicating that TP2 has been received, transmitter 510 is ready to begin transmitting user data over serial transmit link 426 by way of MG transmitter 418. In an example implementation, as a precautionary measure, the enumeration process described above may be repeated multiple successive times (e.g., 3 times) to avoid accidental data alignment and block lock corresponding to accidental detection of TP2.

Over the serial link, however, it is not possible to determine whether the serial link is down or whether null bytes are being transmitted from the receiver data alone. To overcome this issue, transmitter 510 is capable of sending a heartbeat signal to MG transmitter 418, which sends the heartbeat signal over the serial link as a management packet at periodic intervals. If a heartbeat signal is not received within an expected interval by the paired receiver, the serial link is terminated and the enumeration process is triggered.

The enumeration logic described above requires few resources and has a small footprint with respect to the bridge circuits, thereby leaving most of the circuit resources of the respective ICs available for emulation. Once the serial link is enumerated, user data (e.g., emulation data) may be transmitted. Further, data may then be packetized and transmitted over the data virtual channel or the management virtual channel. In cases where neither the data virtual channel nor the management virtual channel has any data to transmit, transmitter 510 may transmit an idle pattern, e.g., null bytes, over the serial link. Sending long trails of null bytes over the serial link, however, may cause clock data recovery logic of the receiver to lose lock resulting in the serial link going down. In one aspect, data may be scrambled prior to conveyance over the serial link to overcome the loss of lock owing to sending null bytes.

The transmitter 510 may also include scrambling logic (not shown) that is capable of scrambling the packetized data received from packetizer 512. Scrambling the packetized data helps to maintain DC balancing and clock data recovery (CDR) for the MG transceiver line rate. In one aspect, the scrambling logic applies multiplicative scrambling to the data. Additive scrambling requires a receiver to be synchronized with a known pattern. By comparison, multiplicative scrambling is self-synchronizing and need not be synchronized as is the case with additive scrambling. Further, as the environment in which system 100 is used is largely known, controlled, and not considered harsh or noisy, multiplicative scrambling is suitable. In the examples described within this disclosure, synchronization between transmitters/receivers may be achieved using a synchronization (synch) pattern. In one aspect, the scrambler circuit in transmitter 510 and the descrambler logic in the corresponding receiver 516 may be reset at periodic intervals to adjust for drift during periods of long operation. As an example, the scrambler and descrambler logic may be reset after a predetermined number of transmissions. A management packet sent over the management virtual channel may be used for re-synchronization. In an example implementation, the scrambler logic and descrambler logic may be reset after 64 k transmissions. It should be appreciated that the number of transmissions detected to initiate re-synchronization may be larger or smaller than the example provided.

Example implementations created in accordance with the inventive arrangements described within this disclosure are capable of providing approximately 8.8 gbps of data throughput of memory mapped channel read and memory mapped channel write (e.g., approximately 17 gbps read and write performance) over a 12.5 Gbps line rate. Latency obtained is predictable with varying burst lengths of the data transfers. For purpose of testing and validation, AXI channels were used. It should be appreciated that the particular rates described may increase with increasing capabilities of MG transceivers.

In a system such as that described in connection with FIGS. 1-3, the processor may execute an operating system (e.g., a Linux Operating System). In such cases, the processor communicates with the other ICs including other bridge circuits and partitions as peripheral devices. In such a configuration, the peripherals should be configured prior to the processor booting the operating system so that the proper drivers for the peripheral devices may be loaded for use by the processor. However, this is not possible in all situations. For example, it may be desirable to run one or more of the ICs of the system in a low power mode. This may be accomplished through partial reconfiguration technology where a portion of the IC, e.g., the portion that runs the partition of the circuit design, is cleared using partial reconfiguration to stop the clock. Using partial reconfiguration, the partition implemented by one IC may also be swapped out with another partition thereby allowing different peripherals and/or accelerators to be implemented in one IC over time. Certain on-chip bus interconnects such as AMBA support low power mode implementations achieved via partial reconfiguration, but do not support hot swapping of circuitry as also may be performed using partial reconfiguration. By partitioning these interconnects and using the serial link as described herein, both the low power modes and the hot swapping of circuitry are supported.

Figure 8:
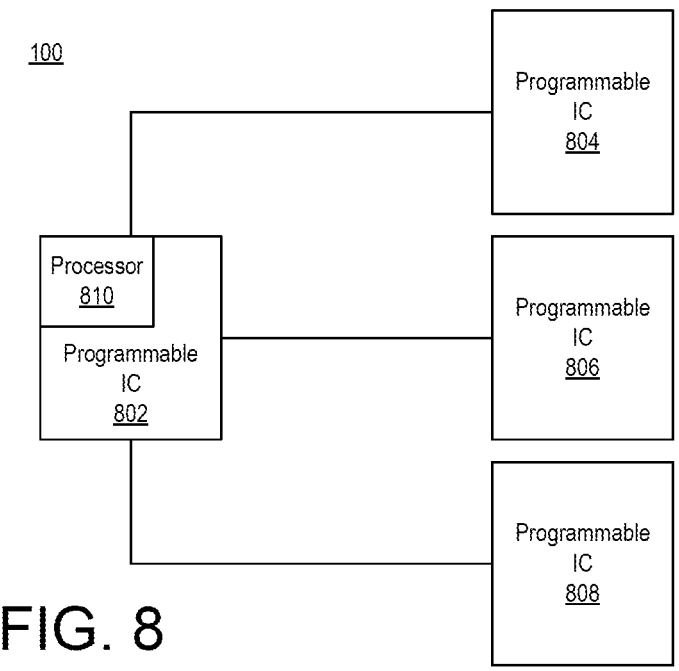
FIG. 8 illustrates another example of a system including multiple ICs where the serial links may be used to support additional operations.

FIG. 8 illustrates another example of system 100 including multiple ICs where the serial links may be used to support boot and power save modes of operation. In the example of FIG. 8, system 100 includes programmable ICs 802, 804, 806, and 808. For example, programmable ICs 802, 804, 806, and 808 may be implemented as FPGAs.

Programmable IC 802 is coupled to each of programmable ICs 804, 806, and 808 via serial link established via bridge circuits (not shown) disposed in each respective IC. Further, programmable IC 802 includes a processor 810 that is capable of booting an operating system. Example implementations of processor 810 may include, but are not limited to, a processor having an x86 type of architecture (IA-32, IA-64, etc.), a Power Architecture, an ARM processor, or the like. For example, programmable IC 802, including processor 810 therein, may be the system controller.

In the example, processor 810 boots without any knowledge of the other devices, e.g., programmable ICs 804, 806, and/or 808, connected thereto. After processor 810 boots successfully, connected devices or endpoints such as programmable ICs 804, 806, and/or 808 may boot on demand and issue interrupts to processor 810. Each programmable IC 804-808 may include an interrupt pin that is connected to processor 810. After successful configuration of a device, each device (e.g., programmable ICs 804-808) is capable of asserting an interrupt to processor 810.

In response to receiving in interrupt from programmable ICs 804, 806, and/or 808, processor 810 is capable of reading the configuration of the programmable IC from which the interrupt was received by issuing a memory read over the serial link to the IC. For purposes of illustration, programmable IC 806 may be the device that issued the interrupt. The memory read may be directed to a predetermined or fixed offset (e.g., address) corresponding to programmable IC 806 or particular registers contained therein. In one aspect, in the case of the Linux operating system, the memory read may be initiated by a Linux daemon in response to the interrupt. Regardless of the operating system, the processor 810 is capable of executing program code that monitors for, or waits for, interrupts from programmable ICs 804-808.

Programmable IC 806 is capable of responding to the read request with data identifying programmable IC 806 and any peripherals (e.g., IP cores and/or circuits) implemented in programmable IC 806 once booted or configured. For example, the peripherals listed may include circuits and/or systems implemented in programmable circuitry of programmable IC 806. Processor 810, e.g., an operating system daemon executed by processor 810, in response to receiving data from programmable IC 806 in response to the read request, is capable of issuing a device tree overlay, e.g., updating the device tree with the address and/or peripheral information received from programmable IC 806, and loading the required drivers to initialize programmable IC 802 for communicating with programmable IC 806 and any peripherals contained in programmable IC 806.

In cases where programmable IC 806 is to enter a low power state, programmable IC 806 may issue an interrupt to processor 810. In response to the interrupt in this case, processor 810 may execute an interrupt service routine that causes processor 810 to update the device tree by removing any peripherals listed therein that are disposed in programmable IC 806 that will be powered down and, as such, unavailable. Programmable IC 806 may then implement a power down procedure and enter the low power state in response to issuing the interrupt.

Figure 9:
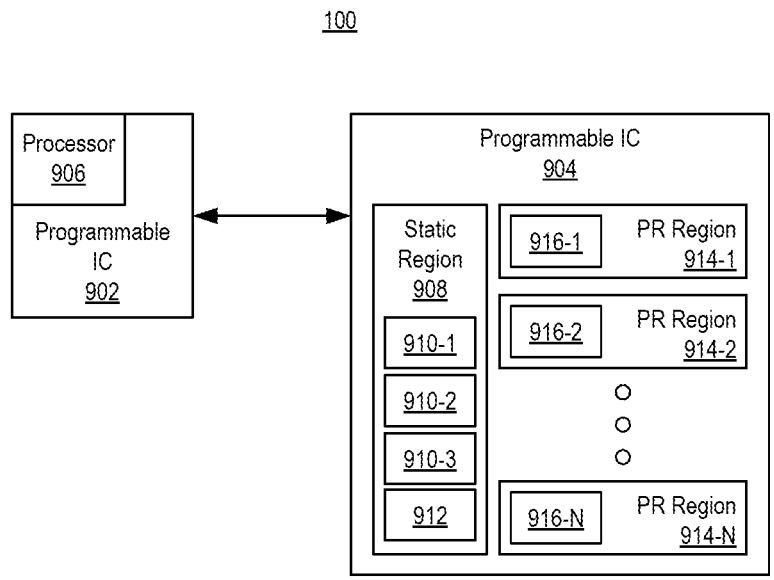
FIG. 9 illustrates another example of a system including multiple ICs where the serial links may be used to support partial reconfiguration.

FIG. 9 illustrates another example of system 100 including multiple ICs where the serial links may be used to support partial reconfiguration modes of operation. FIG. 9 includes programmable ICs 902 and 904. Programmable IC 902 includes a processor 906. Processor 906 may be implemented as described in connection with processor 810 of FIG. 8. Programmable IC 902 may be a system controller.

In the example, programmable IC 904 includes a static region 908 and one or more partial reconfiguration (PR) regions 914-1, 914-2 through 914-N. Partial reconfiguration is a process where a region of programmable circuitry within the programmable IC referred to as a "partial reconfiguration region" or "PR region" may be dynamically reconfigured by loading partial configuration data (e.g., sometimes called a partial configuration bitstream) into the programmable IC. The partial configuration data corresponds to a particular PR region or particular PR regions and may create or implement different circuitry in the PR region(s) that was previously implemented. The partial configuration data does not specify new and/or different circuitry for portions of programmable circuitry outside of the particular or designated PR region(s). A PR region may undergo modification through partial reconfiguration, e.g., the loading of partial configuration data for the PR region, repeatedly where different partial configuration data specifies different circuitry to be implemented therein, while the other regions of the programmable circuitry of the programmable IC referred to as "static circuitry" or "static regions" continue to operate without interruption.

Static region 908 may include circuit blocks such as data movers 910 and/or other resources 912 (e.g., interrupt control circuits, status registers, control registers, input/output, communication endpoints, and peripherals). Each PR region 914 may include a memory 916 that may be read by processor 906. In the example, each memory 916 may store information describing the functionality of the circuitry (e.g., the accelerator) implemented in the PR region once configured or reconfigured.

In the example of FIG. 9, processor 906 is capable of performing discovery similar to the process described in the example of FIG. 8. For example, upon configuration and/or reconfiguration of a PR region, an interrupt is generated from programmable IC 904 to processor 906. Processor 906, in response to the interrupt, executes an interrupt service routine that causes processor 906 to read the data stored in the memory 916 for any PR region 914 having been reconfigured (e.g., based on the interrupt). By reading the memory 916 of the reconfigured PR region(s) 914, processor 906 may update the device tree as appropriate based on or using the data read from the memories 916 and/or load any needed device drivers to communicate with circuitry in the reconfigured PR region(s) 914.

In the example of FIG. 9, the bridge circuits are not illustrated. In an example implementation, the bridge circuit within programmable IC 904 may be implemented in static region 908 and connect to each PR region 914-1 via one or more of the channels described herein.

Figure 10A:
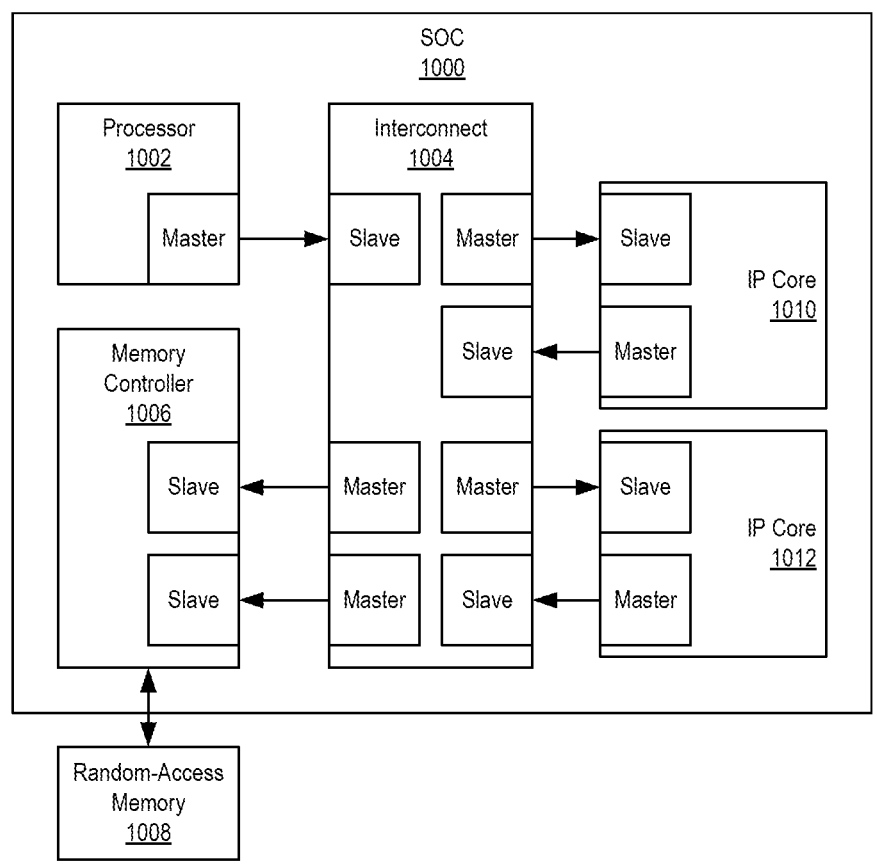
FIGS. 10A and 10B, taken collectively, illustrate an example where a circuit is partitioned for implementation in a system having multiple ICs.
Figure 10B:
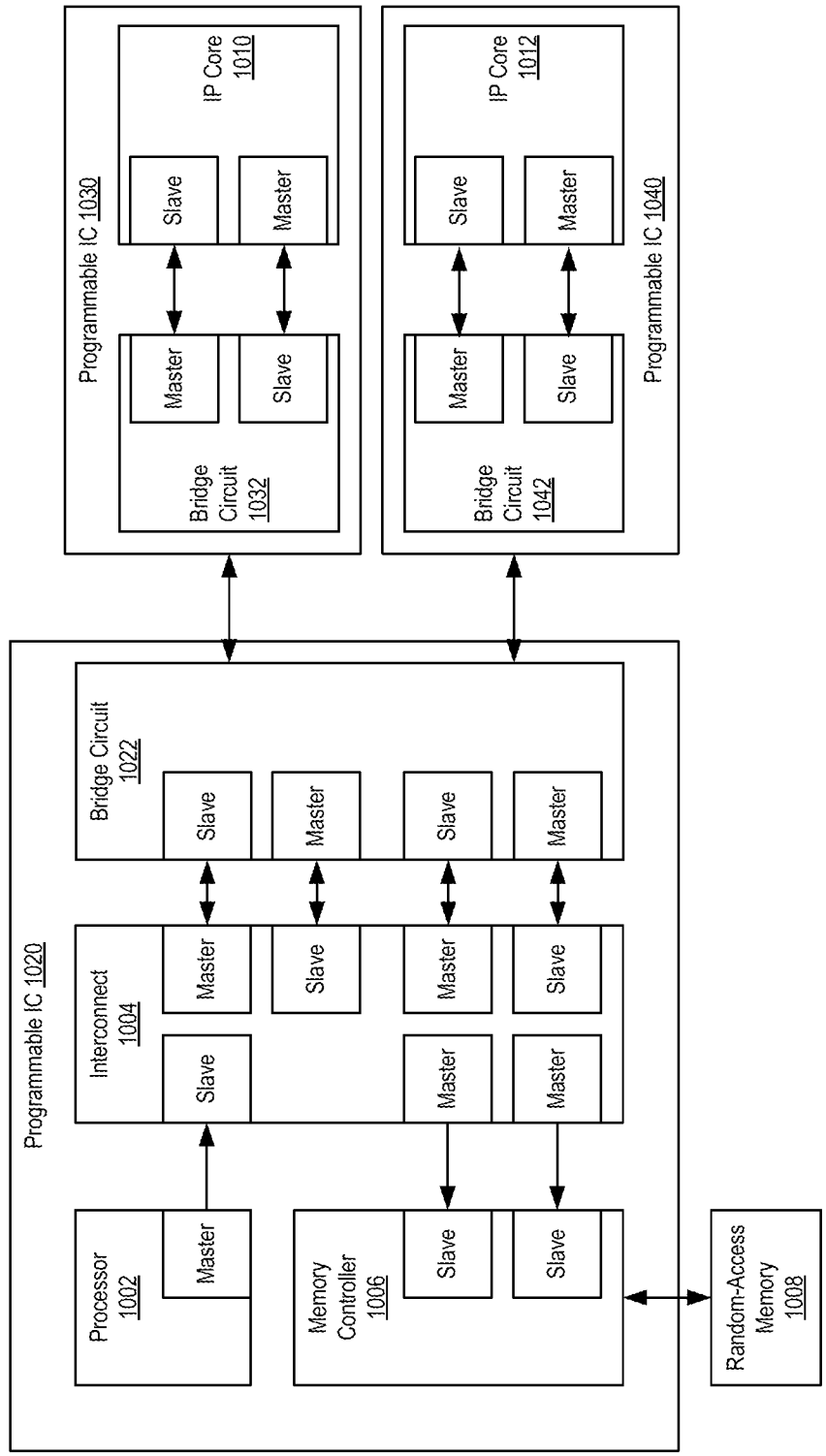

FIGS. 10A and 10B, taken collectively, illustrate an example use case for the bridge circuits described within this disclosure. FIG. 10A illustrates an example of an SOC 1000 being developed. The design may be intended for implementation in a single IC. As illustrated, the design includes a processor coupled to an interconnect 1004. Interconnect 1004 is also coupled to a memory controller 1006 that is capable of accessing a RAM 1008. Interconnect 1004 is also coupled to an IP core 1010 and an IP core 1012. Due to the size and complexity of the design, the design may not be emulated, for purposes of development, in a single IC.

FIG. 10B illustrates an example where the design of FIG. 10A is partitioned along the on-chip communication channel boundaries (e.g., along AXI interconnect boundaries in this case) and implemented in a multi-IC emulation system as described within this disclosure. As shown, programmable IC 1020 implements processor 1002, interconnect 1004, and memory controller 1006. A bridge circuit 1022 is included in programmable IC 1020 to couple to interconnect 1004 via a plurality of channels.

Programmable IC 1030 implements IP core 1010. A bridge circuit 1032 is inserted into programmable IC 1030 and couples to IP core 1010 via one or more channels. Programmable IC 1040 implements IP core 1012. A bridge circuit 1042 is inserted into programmable IC 1040 and couples to IP core 1012 via one or more channels. Bridge circuit 1022 communicates with bridge circuit 1032 via a serial link (e.g., such as serial link 440). Bridge circuit 1022 communicates with bridge circuit 1042 via another serial link (e.g., another serial link 440).

The example of FIG. 10 illustrates the partitioning of the circuit design along on-chip interconnect boundaries. What were synchronous communication channels conveying parallel data connecting interconnect 1004 with IP cores 1010 and 1012 are transformed into asynchronous serial links.

The inventive arrangements described within this disclosure reduces the total amount of resource utilization in each of the ICs of the multi-IC system. Further, the ability to use more ICs for purposes of emulation and/or prototyping, allows the design tools to generate an implementation faster (e.g., in less runtime) than would otherwise be the case. That is, processes like synthesis, placement, and routing may be performed in less time.

Another benefit of using bridge circuits in multi-IC systems is that the cost of implementing an emulation system may be significantly reduced. The reduction in cost arises from several factors. One factor is a reduction in the number of layers needed in circuit boards due to the ability to convey a larger number of signals over the serial links. This aspect of an emulation system may reduce the cost of each circuit board by more than half. Another factor is that the cables that may be used for the serial links between MG transceivers cost significantly less than the cables used to link ICs in conventional emulation systems using Select I/O.

Though one or more of the examples described herein are in the context of emulation and/or prototyping of circuit designs, the example implementations described herein may also be used for distributed computing and/or resource sharing.

FIG. 11 is an example method 1100 of implementing a circuit design using a multi-IC system and the bridge circuit architectures described herein.

In block 1102, the circuit design may be partitioned along a partition boundary. The partition boundary may be defined by an on-chip bus interconnect, e.g., AXI interconnects, resulting in a plurality of partitions of the circuit design. The plurality of partitions include at least a first partition and a second partition. The partitioning may be performed by a computer-based Electronic Design Automation (EDA) system. In one aspect, the partitioning may be performed for purposes of emulating and/or prototyping the circuit design.

Partitioning the circuit design as described in block 1102 may be performed in less runtime than other partitioning techniques. For example, other conventional partitioning techniques attempt to determine cuts (e.g., partitions) that minimize I/O connectivity. This process may be runtime intensive. By partitioning according to interconnect boundaries (e.g., protocol interfaces), the amount of runtime needed to perform the partitioning may be significantly reduced, thereby reducing the amount of time needed to implement the circuit design.

In block 1104, the EDA system may insert one or more bridge circuits for each of the partitions of the circuit design. The insertion of bridge circuits may depend on the number of parallel, synchronous channels of the circuit design that were partitioned or severed from the partitioning that are to be connected across IC boundaries in the multi-IC system.

In block 1106, the first partition may be implemented in a first IC with a first bridge circuit. The second partition may be implemented in a second IC with a second bridge circuit. The first bridge circuit may be coupled to a plurality of first channels of the first partition. The plurality of first channels may be parallel channels. Each channel of the plurality of first channels includes a one or more sub-channels. The second bridge circuit is coupled to a plurality of second channels of the second partition.

For example, the EDA system is capable of processing each partition through a design flow (e.g., synthesis, placement, routing, and/or configuration data generation). The design flow may be performed independently for each partition as each partition may be implemented in a different IC of the multi-IC system.

In block 1108, during runtime of an emulation of the circuit design in the multi-IC system, the first bridge circuit is capable of converting, using the first bridge circuit, data from selected ones of the plurality of sub-channels of the plurality of first channels into packetized data and transmitting the packetized data over a serial link. In block 1110, in response to receiving the packetized data via the second bridge circuit, depacketizing the packetized data via the second bridge circuit, mapping the depacketized data to selected sub-channels of the plurality of second channels. The selected sub-channels of the plurality of second channels correspond to respective ones of the selected sub-channels of the plurality of first channels. In block 1112, the depacketized data is output on the selected sub-channels of the plurality of second channels to the second partition.

For example, the first bridge circuit may receive data on master sub-channels of channel 408-1 clocked at the clock of channel 408-1, packetize the data, and convey the data to MG transceiver 414. MG transceiver 414 sends the data over serial transmit link 426 to the second bridge circuit. The second bridge circuit depacketizes the received data, maps the data onto corresponding master sub-channels of channel 408-1, and outputs the data at the clock rate corresponding to the clock signal for channel 408-1. The packets are conveyed over serial transmit link 426 at a rate that is significantly higher than that of either of channels 406-1, 408-1.

As discussed, each channel of the plurality of first channels (e.g., 406-1) and each corresponding channel of the plurality of second channels (e.g., 408-1) forms an on-chip bus interconnect within an unpartitioned version of the circuit design prior to the partitioning. The serial link is configured to emulate the on-chip bus interconnect severed from the partitioning.

In another aspect, a selected channel of the plurality of first channels operates at a first data rate and a selected channel of the plurality of second channels corresponding to the selected channel of the plurality of first channels operates at a second data rate that is different from the first data rate. For example, though channel 406-1 and 408-2 initially formed a synchronous communication channel, each may be clocked at a different rate as each is implemented in a different IC and coupled via an asynchronous serial link.

In another aspect, the communication link may be enumerated prior to conveying data.

In another aspect, the bridge circuit is capable of periodically conveying a heartbeat signal to the second bridge circuit over the serial link. The heartbeat signal may be conveyed as a management packet periodically.

In another aspect, data may be encoded for sending over the serial link according to a plurality of virtual channels. The plurality of virtual channels can include a data virtual channel configured to convey data packets and a management virtual channel configured to convey management packets.

In another aspect, the second bridge circuit is configured to issue credits to the first bridge circuit prior to the first bridge circuit running out of credits.

Figure 12:
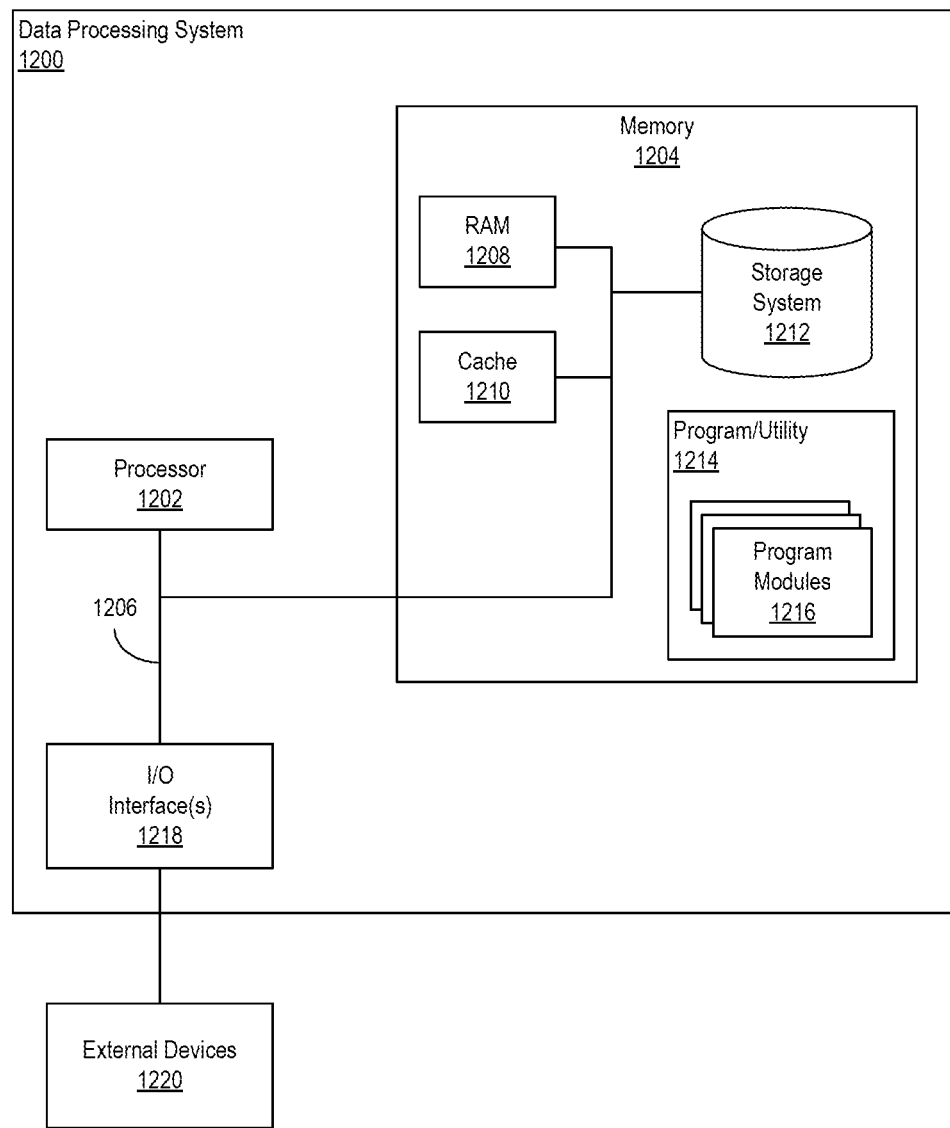
FIG. 12 illustrates an example implementation of a data processing system for use with the inventive arrangements described herein.

FIG. 12 illustrates an example implementation of a data processing system 1200. The components of data processing system 1200 can include, but are not limited to, a processor 1202, a memory 1204, and a bus 1206 that couples various system components including memory 1204 to processor 1202. Processor 1202 may be implemented as one or more processors. In an example, processor 1202 is implemented as a central processing unit (CPU). Example processor types include, but are not limited to, processors having an x86 type of architecture (IA-32, IA-64, etc.), Power Architecture, ARM processors, and the like.

Bus 1206 represents one or more of any of a variety of communication bus structures. By way of example, and not limitation, bus 1206 may be implemented as a PCIe bus. Data processing system 1200 typically includes a variety of computer system readable media. Such media may include computer-readable volatile and non-volatile media and computer-readable removable and non-removable media.

Memory 1204 can include computer-readable media in the form of volatile memory, such as random-access memory (RAM) 1208 and/or cache memory 1210. Data processing system 1200 also can include other removable/non-removable, volatile/non-volatile computer storage media. By way of example, storage system 1212 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1206 by one or more data media interfaces. Memory 1204 is an example of at least one computer program product.

Program/utility 1214, having a set (at least one) of program modules 1216, may be stored in memory 1204. Program/utility 1214 is executable by processor 1202. By way of example, program modules 1216 may represent an operating system, one or more application programs, other program modules, and program data. Program modules 1216, upon execution, cause data processing system 1200, e.g., processor 1202, to carry out the functions and/or methodologies of the example implementations described within this disclosure. Program/utility 1214 and any data items used, generated, and/or operated upon by data processing system 1200 are functional data structures that impart functionality when employed by data processing system 1200.

Data processing system 1200 may include one or more Input/Output (I/O) interfaces 1218 communicatively linked to bus 1206. I/O interface(s) 1218 allow data processing system 1200 to communicate with one or more external devices 1220 and/or communicate over one or more networks such as a local area network (LAN), a wide area network (WAN), and/or a public network (e.g., the Internet). Examples of I/O interfaces 1218 may include, but are not limited to, network cards, modems, network adapters, hardware controllers, etc. Examples of external devices also may include devices that allow a user to interact with data processing system 1200 (e.g., a display, a keyboard, and/or a pointing device) and/or other devices such as accelerator card.

Data processing system 1200 is only one example implementation. Data processing system 1200 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. The example of FIG. 12 is not intended to suggest any limitation as to the scope of use or functionality of example implementations described herein. Data processing system is an example of computer hardware that is capable of performing the various operations described within this disclosure.

In this regard, data processing system 1200 may include fewer components than shown or additional components not illustrated in FIG. 12 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Program modules 1216 also may include software that is capable of performing various operations described herein such as partitioning, modifying circuit designs (e.g., as partitioned) to include bridge circuits, and/or performing a design flow. In this regard, data processing system 1200 serves as an example of an EDA system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" means at least one circuit capable of carrying out instructions contained in program code. The circuit may be an integrated circuit or embedded in an integrated circuit.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

In an example implementation, a system includes a first IC having a first bridge circuit disposed therein. The first bridge circuit includes a plurality of transceiver circuits. Each transceiver circuit is coupled to a corresponding parallel channel in the IC. Each transceiver circuit is configured to send and receive data over the corresponding parallel channel. Each transceiver circuit includes a transmit channel configured to packetized data received from the corresponding parallel channel for transmission over a serial link to a second IC. Each transceiver circuit includes a receive channel configured to depacketize data received from the serial link from the second IC. The serial link is asynchronous to each parallel channel coupled to the first bridge circuit.

The foregoing and other implementations can each optionally include one or more of the following features, alone or in combination. Some example implementations include all the following features in combination.

In another aspect, the first bridge circuit communicates with a second bridge circuit disposed in the second IC. The serial link emulates an on-chip bus interconnect of a circuit design partitioned for implementation in the first IC and the second IC.

In another aspect, the transmit channel includes a clock domain converter configured to convert data received over the corresponding parallel channel to a clock domain corresponding to the transceiver and a data width converter coupled to the clock domain converter. The data width converter is configured to convert a width of the data received over the corresponding parallel channel to a selected width for packetization.

In another aspect, the transmit channel includes a transmitter coupled to the data width converter and configured to generate packets by encoding data from the data width converter for conveyance over the serial link using a plurality of virtual channels. The plurality of virtual channels include a data virtual channel configured to convey data packets and a management virtual channel configured to convey management packets.

In another aspect, each transmitter is configured to generate management packets of one or more sideband signals of the corresponding parallel channel coupled to the transmit channel and, in response to determining that data packets for the corresponding parallel channel are unavailable for sending over the serial link, convey the management packets of the one or more sideband signals via the management virtual channel.

In another aspect, the transmit channel includes a transmitter configured to send the packets according to an amount of credit issued from a second bridge circuit disposed in the second IC.

In another aspect, the transmitter receives additional credits for sending the packets over the serial link prior to available credits of the transmitter being depleted.

In another aspect, the system includes a multi-gigabit transceiver coupled to the first bridge circuit and the serial link. The multi-gigabit transceiver is configured to serialize packets from the transmit channel for conveyance over the serial link and de-serialize packets received from the serial link to provide to the receive channel.

In another example implementation, a system includes a first IC including a first partition of a circuit design coupled to a first bridge circuit. The first bridge circuit is coupled to the first partition through a plurality of first parallel channels. Each first parallel channel includes one or more sub-channels. The first bridge circuit is configured to packetize data from selected sub-channels of the one or more sub-channels of the plurality of first parallel channels for conveyance over a serial link. The system includes a second IC including a second partition of the circuit design coupled to a second bridge circuit through a plurality of second parallel channels. The second bridge circuit is configured to depacketize data received over the serial link, map the depacketized data to selected sub-channels of the plurality of second parallel channels, and output the depacketized data over the selected sub-channels of the plurality of second parallel channels. The selected sub-channels of the plurality of second parallel channels correspond to respective ones of the selected sub-channels of the plurality of first parallel channels.

The foregoing and other implementations can each optionally include one or more of the following features, alone or in combination. Some example implementations include all the following features in combination.

In another aspect, the first partition includes a processor coupled to the bridge circuit.

In another aspect, the serial link is asynchronous to the plurality of first parallel channels and the plurality second parallel channels.

In another aspect, one or more of the plurality of first parallel channels and corresponding ones of the plurality second parallel channels are memory mapped channels.

In another aspect, one or more of the plurality of first parallel channels and corresponding ones of the plurality second parallel channels are stream channels.

In another aspect, each channel of the plurality of first parallel channels and each corresponding channel of the plurality of second parallel channels formed a synchronous on-chip bus interconnect within an unpartitioned version of the circuit design.

In another aspect, a selected channel of the plurality of first parallel channels operates at a first clock frequency and a selected channel of the plurality of second parallel channels corresponding to the selected channel of the plurality of first parallel channels operates at a second clock frequency that is different from the first clock frequency.

In another aspect, the first IC includes a first multi-gigabit transceiver coupled to the first bridge circuit and the serial link. The second IC includes a second multi-gigabit transceiver coupled to the second bridge circuit and the serial link. The first and second multi-gigabit transceivers are configured to serialize packets for conveyance over the serial link and de-serialize packets received from the serial link.

In another aspect, the first bridge circuit periodically conveys a heartbeat signal to the second bridge circuit over the serial link.

In another aspect, data conveyed over the serial link is encoded as a plurality of virtual channels. The plurality of virtual channels include a data virtual channel configured to convey data packets and a management virtual channel configured to convey management packets.

In another aspect, the first bridge circuit is configured to packetize data from selected ones of a plurality of first sideband signals as management packets and convey the management packets over the management virtual channel.

In another aspect, the first bridge circuit is configured to send packets to the second bridge circuit according to an amount of credit issued from the second bridge circuit. The first bridge circuit receives additional credits for sending the packets over the serial link prior to available credits of the first bridge circuit being depleted.

What is claimed is:

1. A system, comprising:
   a first integrated circuit having a first bridge circuit disposed therein, wherein the first bridge circuit includes:
   a plurality of transceiver circuits, wherein each transceiver circuit is coupled to a corresponding parallel channel in the integrated circuit, wherein each transceiver circuit is configured to send and receive data over the corresponding parallel channel;
   wherein each transceiver circuit includes:
   a transmit channel configured to packetize data received from the corresponding parallel channel for transmission over a serial link to a second integrated circuit; and a receive channel configured to depacketize data received from the serial link from the second integrated circuit; and wherein the serial link is asynchronous to each parallel channel coupled to the first bridge circuit; and wherein each transmit channel includes a transmitter configured to generate management packets of one or more sideband signals of the corresponding parallel channel coupled to the transmit channel and, in response to determining that data packets for the corresponding parallel channel are unavailable for sending over the serial link, convey the management packets of the one or more sideband signals via a management virtual channel configured to convey the management packets.

2. The system of claim 1, wherein the first bridge circuit communicates with a second bridge circuit disposed in the second integrated circuit, wherein the serial link emulates an on-chip bus interconnect of a circuit design partitioned for implementation in the first integrated circuit and the second integrated circuit.

3. The system of claim 1, wherein the transmit channel includes:
a clock domain converter configured to convert data received over the corresponding parallel channel to a clock domain corresponding to the transceiver; and
a data width converter coupled to the clock domain converter, wherein the data width converter is configured to convert a width of the data received over the corresponding parallel channel to a selected width for packetization.

4. The system of claim 3, wherein the transmit channel includes:
a transmitter coupled to the data width converter and configured to generate packets by encoding data from the data width converter for conveyance over the serial link using a plurality of virtual channels, wherein the plurality of virtual channels include a data virtual channel configured to convey data packets and the management virtual channel configured to convey the management packets.

5. The system of claim 1, wherein the transmit channel includes:
a transmitter configured to send the packets according to an amount of credit issued from a second bridge circuit disposed in the second integrated circuit.

6. The system of claim 5, wherein the transmitter receives additional credits for sending the packets over the serial link prior to available credits of the transmitter being depleted.

7. The system of claim 1, comprising:
a multi-gigabit transceiver coupled to the serial link and to each transmit channel and each receive channel of each transceiver, wherein the multi-gigabit transceiver is configured to serialize packets from each of the transmit channels for conveyance over a differential serial transmit link of the serial link and de-serialize packets received from a differential serial receive link of the serial link to provide to the receive channel.

8. A system, comprising:
a first integrated circuit including a first partition of a circuit design coupled to a first bridge circuit by a plurality of first parallel channels, wherein each first parallel channel includes one or more sub-channels;
wherein the first bridge circuit is configured to packetize data from selected sub-channels of the plurality of first parallel channels for conveyance over a differential transmit link of a serial link; and a second integrated circuit including a second partition of the circuit design coupled to a second bridge circuit by a plurality of second parallel channels;

wherein the second bridge circuit is configured to depacketize data received over the differential transmit link, map the depacketized data to selected sub-channels of the plurality of second parallel channels, and output the depacketized data over the selected sub-channels of the plurality of second parallel channels;

wherein the selected sub-channels of the plurality of second parallel channels correspond to respective ones of the selected sub-channels of the plurality of first parallel channels;

wherein data conveyed over the serial link is encoded as a plurality of virtual channels including a data virtual channel configured to convey data packets and a management virtual channel configured to convey management packets; and wherein the first bridge circuit is configured to packetize data from selected ones of a plurality of sideband signals as management packets and convey the management packets over the management virtual channel.

9. The system of claim 8, wherein the first partition includes a processor coupled to the bridge circuit.

10. The system of claim 8, wherein the serial link is asynchronous to the plurality of first parallel channels and the plurality second parallel channels.

11. The system of claim 8, wherein one or more of the plurality of first parallel channels and corresponding ones of the plurality second parallel channels are memory mapped channels.

12. The system of claim 8, wherein one or more of the plurality of first parallel channels and corresponding ones of the plurality second parallel channels are stream channels.

13. The system of claim 8, wherein each channel of the plurality of first parallel channels and each corresponding channel of the plurality of second parallel channels form a synchronous on-chip bus interconnect within an unpartitioned version of the circuit design.

14. The system of claim 13, wherein a selected channel of the plurality of first parallel channels operates at a first clock frequency and a selected channel of the plurality of second parallel channels corresponding to the selected channel of the plurality of first parallel channels operates at a second clock frequency that is different from the first clock frequency.

15. The system of claim 8, wherein:
the first integrated circuit includes a first multi-gigabit transceiver coupled to the first bridge circuit and the serial link; and
the second integrated circuit includes a second multi-gigabit transceiver coupled to the second bridge circuit and the serial link;
wherein the first and second multi-gigabit transceivers are configured to serialize packets for conveyance over the serial link and de-serialize packets received from the serial link.

16. The system of claim 8, wherein the first bridge circuit periodically conveys a heartbeat signal to the second bridge circuit over the serial link.

17. The system of claim 8, wherein the first bridge circuit is configured to send packets to the second bridge circuit according to an amount of credit issued from the second bridge circuit; and wherein the first bridge circuit receives additional credits for sending the packets over the serial link prior to available credits of the first bridge circuit being depleted.

18. A system, comprising:

an integrated circuit having a bridge circuit disposed therein, wherein the bridge circuit includes:

a plurality of transceiver circuits, wherein each transceiver circuit is coupled to a corresponding parallel channel in the integrated circuit, wherein each transceiver circuit is configured to send and receive data over the corresponding parallel channel;

wherein each transceiver circuit includes:

a transmit channel configured to packetize data received from the corresponding parallel channel for transmission over a serial link to a second integrated circuit; and a receive channel configured to depacketize data received from the serial link from the second integrated circuit;

wherein data conveyed over the serial link is encoded as a plurality of virtual channels including a data virtual channel configured to convey data packets and a management virtual channel configured to convey management packets; and wherein the bridge circuit is configured to packetize data from selected ones of a plurality of sideband signals as management packets and convey the management packets over the management virtual channel.

19. The system of claim 18, further comprising:

a multi-gigabit transceiver coupled to the serial link and to each transmit channel and each receive channel of each transceiver.

20. The system of claim 18, wherein the serial link is asynchronous to each parallel channel coupled to the bridge circuit.

* * * * *